US009902824B2

(12) United States Patent
Ohya et al.

(10) Patent No.: US 9,902,824 B2
(45) Date of Patent: Feb. 27, 2018

(54) COLORED POLYIMIDE MOLDED ARTICLE, AND PROCESS FOR PRODUCTION THEREOF

(71) Applicant: UBE INDUSTRIES, LTD., Yamaguchi (JP)

(72) Inventors: Shyusei Ohya, Chiba (JP); Makoto Matsuo, Chiba (JP)

(73) Assignee: UBE INDUSTRIES, LTD., Ube-shi (JP)

( * ) Notice: Subject to any disclaimer, the term of this patent is extended or adjusted under 35 U.S.C. 154(b) by 0 days.

(21) Appl. No.: 15/094,223

(22) Filed: Apr. 8, 2016

(65) Prior Publication Data
US 2016/0221279 A1    Aug. 4, 2016

Related U.S. Application Data

(62) Division of application No. 13/500,771, filed as application No. PCT/JP2010/067760 on Oct. 8, 2010, now Pat. No. 9,346,927.

(30) Foreign Application Priority Data

Oct. 9, 2009 (JP) ................................. 2009-235672
Oct. 9, 2009 (JP) ................................. 2009-235673

(51) Int. Cl.
    *B29C 71/02*   (2006.01)
    *C08L 79/08*   (2006.01)
    (Continued)

(52) U.S. Cl.
    CPC .................. *C08J 5/18* (2013.01); *C08J 3/212* (2013.01); *C08J 9/0066* (2013.01); *C08J 9/28* (2013.01);
    (Continued)

(58) Field of Classification Search
    CPC ... C08J 5/18; C08J 9/28; C08J 2379/08; C08J 9/0066; C08J 9/34; C08J 3/212; Y10T 428/249981
    (Continued)

(56) References Cited

U.S. PATENT DOCUMENTS

3,541,036 A      11/1970  Libackyj
3,954,711 A  *   5/1976   Gruffaz ................. C08G 73/12
                                                    528/321
(Continued)

FOREIGN PATENT DOCUMENTS

JP    63-006503 A     1/1988
JP    5 119212        5/1993
(Continued)

OTHER PUBLICATIONS

International Search Report dated Dcember 21, 2010 in PCT/JP10/67760 Filed Oct. 8, 2010.
(Continued)

*Primary Examiner* — Nahida Sultana
(74) *Attorney, Agent, or Firm* — Oblon, McClelland, Maier & Neustadt, L.L.P.

(57) ABSTRACT

Disclosed is a process for production of a colored polyimide molded article including the steps of molding a polyamic acid solution composition containing a polyamic acid solution obtained from at least a tetracarboxylic acid component and a diamine component and a coloring precursor, or a polyimide solution composition containing a polyimide solution and a coloring precursor; and then thermally treating a molded product at 250° C. or higher.

3 Claims, 1 Drawing Sheet

(51) Int. Cl.
  *C08J 5/18* (2006.01)
  *C08J 3/21* (2006.01)
  *C08J 9/00* (2006.01)
  *C08J 9/28* (2006.01)
  *C08J 9/34* (2006.01)

(52) U.S. Cl.
  CPC ............ *C08J 9/34* (2013.01); *C08J 2201/05* (2013.01); *C08J 2379/08* (2013.01); *Y10T 428/249981* (2015.04)

(58) Field of Classification Search
  USPC ................... 264/234, 46.4, 331.19; 524/538; 428/220, 316.6
  See application file for complete search history.

(56) References Cited

U.S. PATENT DOCUMENTS

| | | | | |
|---|---|---|---|---|
| 4,775,856 | A * | 10/1988 | Ochs | B60T 11/26 200/84 R |
| 4,847,311 | A | 7/1989 | Yamaya et al. | |
| 5,486,258 | A * | 1/1996 | Onishi | C09J 5/00 156/307.5 |
| 5,922,476 | A * | 7/1999 | Arita | B32B 25/08 156/309.9 |
| 6,441,083 | B1 | 8/2002 | Kuwamoto et al. | |
| 6,565,962 | B2 | 5/2003 | Ohya et al. | |
| 6,653,433 | B2 | 11/2003 | Edman et al. | |
| 7,097,781 | B2 * | 8/2006 | Asakawa | B82Y 10/00 216/56 |
| 8,414,806 | B2 * | 4/2013 | Sun | B01D 67/0039 156/296 |
| 8,765,862 | B2 | 7/2014 | Matsumura et al. | |
| 2002/0010311 | A1 | 1/2002 | Edman et al. | |
| 2003/0098518 | A1 * | 5/2003 | Averdung | B01D 67/003 264/10 |
| 2003/0121844 | A1 | 7/2003 | Koo | |
| 2004/0099603 | A1 | 5/2004 | Livingston | |
| 2005/0221193 | A1 | 10/2005 | Kinouchi et al. | |
| 2006/0042750 | A1 | 3/2006 | Usuki et al. | |
| 2006/0118999 | A1 * | 6/2006 | Cooper | B29C 37/0028 264/255 |
| 2006/0199895 | A1 | 9/2006 | Ozawa et al. | |
| 2006/0247411 | A1 * | 11/2006 | Inoue | C08G 73/10 528/170 |
| 2007/0090560 | A1 * | 4/2007 | Kassa | B29C 44/18 264/230 |
| 2007/0170393 | A1 | 7/2007 | Zhang | |
| 2007/0206303 | A1 | 9/2007 | Sumino et al. | |
| 2008/0105855 | A1 | 5/2008 | Buretea et al. | |
| 2008/0242789 | A1 * | 10/2008 | Zhu | C08L 67/02 524/451 |
| 2008/0302243 | A1 | 12/2008 | Byrd et al. | |
| 2010/0248095 | A1 * | 9/2010 | Aoyagi | G02B 5/223 430/7 |
| 2010/0252940 | A1 * | 10/2010 | Huang | C09J 7/0282 257/792 |
| 2010/0326994 | A1 * | 12/2010 | Ichikawa | B29B 11/08 220/675 |
| 2011/0020571 | A1 * | 1/2011 | Sun | B29C 49/0005 428/35.7 |
| 2011/0039085 | A1 | 2/2011 | Carney et al. | |
| 2012/0112134 | A1 * | 5/2012 | Jung | B82Y 30/00 252/511 |
| 2012/0161352 | A1 * | 6/2012 | Yamamoto | H01M 8/0223 264/45.3 |
| 2012/0206923 | A1 * | 8/2012 | Tanaka | B29C 44/0438 362/326 |
| 2013/0045355 | A1 | 2/2013 | Ohya | |
| 2013/0266865 | A1 * | 10/2013 | Kwon | H01M 4/386 429/220 |
| 2014/0093714 | A1 * | 4/2014 | Becks | C08K 3/04 428/220 |
| 2014/0174787 | A1 * | 6/2014 | Zant | H01B 13/06 174/111 |
| 2014/0220335 | A1 * | 8/2014 | Lin | B29C 41/24 428/327 |
| 2014/0251897 | A1 | 9/2014 | Livingston | |
| 2014/0319047 | A1 | 10/2014 | Cheng et al. | |
| 2014/0342145 | A1 * | 11/2014 | Oguro | C08L 77/02 428/220 |

FOREIGN PATENT DOCUMENTS

| | | |
|---|---|---|
| JP | 11 310658 | 11/1999 |
| JP | 2000 275423 | 10/2000 |
| JP | 2001 145826 | 5/2001 |
| JP | 2001-171013 A | 6/2001 |
| JP | 2004 304024 | 10/2004 |
| JP | 2005-247988 A | 9/2005 |
| WO | 2010 38873 | 4/2010 |

OTHER PUBLICATIONS

Office Action dated Sep. 2, 2014 in the corresponding Japanese Patent Application No. 2011-535478.
Extended European Search Report dated Mar. 6, 2014 in Patent Application No. 10822137.5.
Office Action dated Sep. 19, 2016 in Korean Patent Application No. 10-2012-7008940.

\* cited by examiner

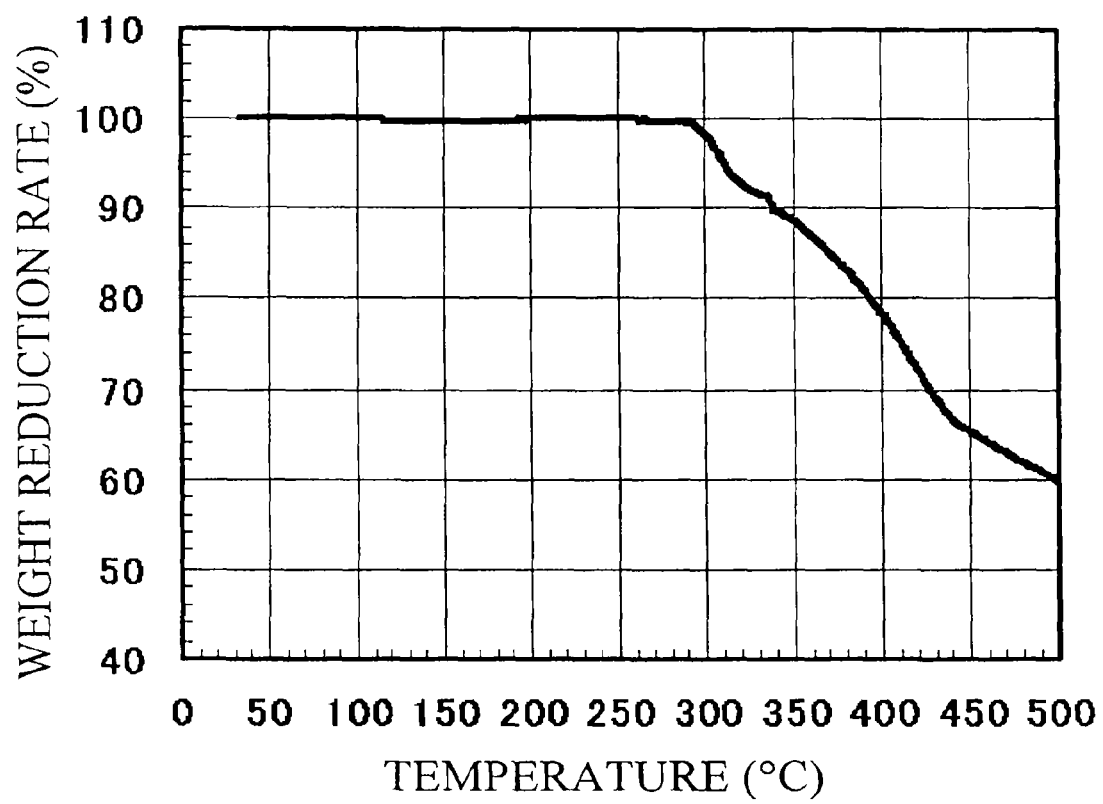

COLORED POLYIMIDE MOLDED ARTICLE, AND PROCESS FOR PRODUCTION THEREOF

CROSS REFERENCE TO RELATED APPLICATIONS

The present application is a divisional of U.S. patent application Ser. No. 13/500,771, filed on Apr. 6, 2012, the text of which is incorporated herein by reference and which is a 35 U.S.C. § 371 national stage patent application of international patent application PCT/JP10/067760, filed on Oct. 8, 2010, the text of which is incorporated herein by reference and which claims priority to Japanese patent applications JP 2009-235672, filed on Oct. 9, 2009, and JP 2009-235673, filed on Oct. 9, 2009, the texts of which are incorporated herein by reference.

TECHNICAL FIELD

The present invention relates to a process for production of a colored polyimide molded article and a colored polyimide molded article obtained by the process.

BACKGROUND ART

In general, in the case of coloring a polymer molded article, dyes or pigments are used.

For example, in Patent Document 1, there is exemplified a color elution preventive method of a colored resin pattern in which in forming a colored resin pattern using a colored polyimide resin material having a dye incorporated into a polyamic acid, followed by a thermal treatment for curing, an aromatic diamine is previously added to the colored polyimide resin material, and the dye is coupled with a polyimidized polymer matrix via the aromatic diamine by a thermal treatment.

In patent document 2, there is disclosed a colored polyimide film for coating an electronic component containing a colored pigment in a resin component composed mainly of a polyimide resin obtained from an aromatic tetracarboxylic dianhydride, an aliphatic linear chain-containing aromatic diamine, and a siloxane diamine.

Pigments and dyes have both strong and weak points, respectively. For example, though the pigments are advantageous from the standpoint of heat resistance, they are difficult to be uniformly dispersed in a resin. Though the dyes have such an advantage that they are uniformly dispersed (or dissolved), they involve such a problem that they are easily eluted from a resin due to influences of a solvent or the like.

Incidentally, polyimide porous membranes are used for separators for batteries and diaphragms for electrolytic capacitors as well as for dust collection, precise filtration, separation, etc. and various production processes have been known.

For example, in Patent Document 3, there are disclosed a polyimide porous membrane having through-holes having a diameter of from about 0.01 to 10 µm and a process for production of a polyimide porous membrane comprising laminating a porous film on a cast film of a polyamic acid varnish and then dipping the laminate in a poor solvent.

CITATION LIST

Patent Literature

[Patent Document 1]: JP-A-5-119212
[Patent Document 2]: JP-A-2004-304024
[Patent Document 3]: JP-A-11-310658

SUMMARY OF INVENTION

Technical Problem

In general, polyimide molded articles such as colored polyimide films and the like are produced by kneading a pigment such as carbon black and the like and a polymer solution such as a polyamic acid solution and the like, molding the mixture, removing a solvent or the like, and then heating the residue to deposit a polymer. Furthermore, in the case where the molded article is a porous membrane, it is also performed to color the surface of the porous membrane.

But, when the surface of the porous membrane is colored, there is a possibility that controlled characteristics of the porous membrane are lost.

Furthermore, the pigment such as carbon black and the like does not have solubility with the polymer solution, so in order to obtain a uniform mixed/dispersed state, the surface of the pigment such as carbon black and the like must be modified, or a special kneader is necessary for achieving sufficient kneading, thereby requiring a great deal of labor from the practical viewpoint. Moreover, in the obtained molded articles, it is not meant that those having an excellent surface appearance are easily obtained. It is necessary to determine an optimum condition through trial and error in conformity with a combination of materials, a molding condition, a kneading condition, or the like.

Moreover, when the pigment such as carbon black and the like is used, a production line is stained. Therefore, it is necessary to prepare an exclusive production line, or to entirely disassemble the line and sufficiently clean it. Thus, a great deal of labor and cost, or a large amount of a cleaner such as a cleaning solvent and the like is necessary.

In order to solve the foregoing problems, an object of the present invention is to provide a process for production of a colored polyimide molded article in a black based color without using a pigment such as carbon black or a dye and a colored polyimide molded article obtained by that process.

Solution to Problem

The present invention relates to the following (1) and (2).
(1) A process for production of a colored polyimide molded article comprising the steps of molding a polyamic acid solution composition containing a polyamic acid solution obtained from at least a tetracarboxylic acid component and a diamine component and a coloring precursor, or a polyimide solution composition containing a polyimide solution and a coloring precursor; and then thermally treating a molded product at 250° C. or higher.

(2) A colored polyimide molded article obtained by the process as set forth above in (1).

Advantageous Effects of Invention

According to the production process of the present invention, since a material having compatibility with a polyamic acid solution or a polyimide solution is used as the coloring precursor and having such properties that when heated at 250° C. or higher, it is colored in a black based color, (1) it can be easily uniformly dissolved in the polyamic acid solution or the polyimide solution without using a special kneader; (2) a colored polyimide molded article having an excellent surface appearance can be easily obtained; and (3) cleaning of the line after the production can be easily performed.

The effects of the present invention are described below in more detail.

In the production process of a colored polyimide molded article of the present invention, in view of the fact that a coloring precursor which is spontaneously thermally decomposed, carbonized and colored in a thermal imidization step regardless of existence of a polyamic acid is used, a degree of freedom of a combination with a polyimide or additives thereof, namely a design of materials is large, so the present invention is very industrially beneficial.

Furthermore, almost all of dyes or pigments are decolored by thermal decomposition in a thermal imidization step or under a use environment of materials. However, even when the coloring precursor which is used in the present invention is transparent or white at room temperature in an ordinary state, it is colored upon thermal decomposition in a thermal imidization step or under a high-temperature use environment and modification into a carbide, so it is able to keep an initial hue without causing decoloration even in the use of a material at a high temperature over a long period of time. Thus, the present invention using this coloring precursor is very industrially beneficial.

BRIEF DESCRIPTION OF DRAWINGS

FIG. 1 is a graph showing a change in thermal weight reduction rate in heating a polyacrylonitrile copolymer in an air atmosphere from room temperature at a rate of 5° C./min (Referential Example 1).

DESCRIPTION OF EMBODIMENTS

The production process of a colored polyimide molded article of the present invention comprises:
(1) steps of molding a polyamic acid solution composition containing a polyamic acid solution obtained from at least a tetracarboxylic acid component and a diamine component and a coloring precursor and then thermally treating a molded product at 250° C. or higher (first invention); or
(2) steps of molding a polyimide solution composition containing a polyimide solution and a coloring precursor and then thermally treating a molded product at 250° C. or higher (second invention).

Furthermore, in the first invention, in the case where the colored polyimide molded article is a colored polyimide porous membrane, the production process of a colored polyimide porous membrane of the present invention comprises a step of dipping a film obtained by casting the polyamic acid solution composition in a poor solvent against the polyamic acid to fabricate a porous polyamic acid film; and a step of thermally treating the porous polyamic acid film at 250° C. or higher (third invention).

<First Invention>

The first invention comprises the steps of molding a polyamic acid solution composition containing a polyamic acid solution obtained from at least a tetracarboxylic acid component and a diamine component and a coloring precursor; and then thermally treating a molded product at 250° C. or higher.

(Polyamic Acid)

The polyamic acid is obtained by polymerizing a tetracarboxylic acid component and a diamine component. The polyamic acid is a polyimide precursor capable of being converted into a polyimide through ring opening by thermal imidization or chemical imidization.

As the tetracarboxylic acid component, a known tetracarboxylic acid component can be used, and a tetracarboxylic dianhydride is preferable.

Specific examples of the tetracarboxylic dianhydride include pyromellitic dianhydride, biphenyltetracarboxylic dianhydrides such as 3,3',4,4'-biphenyltetracarboxylic dianhydride (s-BPDA), 2,3,3',4'-biphenyltetracarboxylic dianhydride (a-BPDA), 2,2',3,3'-biphenyltetracarboxylic dianhydride, and the like, oxydiphthalic dianhydride, diphenylsulfone-3,4,3',4'-tetracarboxylic dianhydride, bis(3,4-dicarboxyphenyl)sulfide dianhydride, 2,2-bis(3,4-dicarboxyphenyl)-1,1,1,3,3,3-hexafluoropropane dianhydride, 2,3,3',4'-benzophenone tetracarboxylic dianhydride, 3,3',4,4'-benzophenone tetracarboxylic dianhydride, bis(3,4-dicarboxyphenyl)methane dianhydride, 2,2-bis(3,4-dicarboxyphenyl)propane dianhydride, p-phenylene bis(trimellitic acid monoester anhydride), p-biphenylene bis(trimellitic acid monoester anhydride), m-terphenyl-3,4,3',4'-tetracarboxylic dianhydride, p-terphenyl-3,4,3',4'-tetracarboxylic dianhydride, 1,3-bis(3,4-dicarboxyphenoxy)benzene dianhydride, 1,4-bis(3,4-dicarboxyphenoxy)benzene dianhydride, 1,4-bis(3,4-dicarboxyphenoxy)biphenyl dianhydride, 2,2-bis[(3,4-dicarboxyphenoxy)phenyl]propane dianhydride, 2,3,6,7-naphthalene tetracarboxylic dianhydride, 1,4,5,8-naphthalene tetracarboxylic dianhydride, 4,4'-(2,2-hexafluoroisopropylidene)diphthalic dianhydride, and so on. Furthermore, an aromatic tetracarboxylic acid such as 2,3,3',4'-diphenylsulfone tetracarboxylic acid and the like can also be used.

Of these, in particular, one or more members of aromatic tetracarboxylic dianhydrides selected from a biphenyltetracarboxylic dianhydride and pyromellitic dianhydride are preferable. As the biphenyltetracarboxylic dianhydride, 3,3',4,4'-biphenyltetracarboxylic dianhydride (s-BPDA) is more preferable.

The tetracarboxylic acid component can be used singly or in combination of two or more kinds thereof The diamine component is not particularly limited, and a known diamine component can be used. Examples thereof include (i) a benzenediamine having one benzene nucleus, (ii) a diamine having two benzene nuclei, (iii) a diamine having three benzene nuclei, (iv) a diamine having four benzene nuclei, and so on.

Examples of the benzenediamine having one benzene nucleus (i) include 1,4-diaminobenzene (p-phenylenediamine), 1,3-diaminobenzene, 2,4-diaminotoluene, 2,6-diaminotoluene, and so on.

Examples of the amine having two benzene nuclei (ii) include diaminodiphenyl ethers such as 4,4'-diaminodiphenyl ether (DADE), 3,4'-diaminodiphenyl ether, 3,3'-diaminodiphenyl ether, and the like, 4,4'-diaminodiphenylmethane, 3,3'-dimethyl-4,4'-diaminobiphenyl, 2,2'- dimethyl-4,4'-diaminobiphenyl, 2,2'-bis(trifluoromethyl)-4,4'-diaminobiphenyl, 3,3'-dimethyl-4,4'-diaminodiphenylmethane, 3,3'-dicarboxy-4,4'-diaminodiphenylmethane, 3,3',5,5'-tetramethyl-4,4'-diaminodiphenylmethane, bis(4-aminophenyl) sulfide, 4,4'-diaminobenzanilide, 3,3'-dichlorobenzidine, 3,3'-dimethylbenzidine, 2,2'-dimethylbenzidine, 3,3'-dimethoxybenzidine, 2,2'-dimethoxybenzidine, 3,3'-diaminodiphenyl ether, 3,4'-diaminodiphenyl ether, 4,4'-diaminodiphenyl ether, 3,3'-diaminodiphenyl sulfide, 3,4'-diaminodiphenyl sulfide, 4,4'-diaminodiphenyl sulfide, 3,3'-diaminodiphenyl sulfone, 3,4'-diaminodiphenyl sulfone, 4,4'-diaminodiphenyl sulfone, 3,3'-diaminobenzophenone, 3,3'-diamino-4,4'-dichlorobenzophenone, 3,3'-diamino-4,4'-dimethoxybenzophenone, 3,3'-diaminodiphenylmethane, 3,4'-diaminodiphenylmethane, 4,4'-diaminodiphenylmethane, 2,2-bis(3-aminophenyl)propane, 2,2-bis(4-aminophenyl)propane, 2,2-bis(3-aminophenyl)-1,1,1,3,3,3-hexafluoropropane, 2,2-bis(4-aminophenyl)-1,1,1,3,3,3-hexafluoropropane, 3,3'-diaminodiphenyl sulfoxide, 3,4'-diaminodiphenyl sulfoxide, 4,4'-diaminodiphenyl sulfoxide, and so on.

Examples of the diamine having three benzene nuclei (iii) include 1,3-bis(3-aminophenyl)benzene, 1,3-bis(4-aminophenyl)benzene, 1,4-bis(3-aminophenyl)benzene, 1,4-bis(4-aminophenyl)benzene, 1,3-bis(4-aminophenoxy)benzene, 1,4-bis(3-aminophenoxy)benzene, 1,4-bis(4-aminophenoxy)benzene, 1,3-bis(3-aminophenoxy)-4-trifluoromethylbenzene, 3,3'-diamino-4-(4-phenyl)phenoxybenzophenone, 3,3'-diamino-4,4'-di(4-phenylphenoxy)benzophenone, 1,3-bis(3-aminophenyl sulfide)benzene, 1,3-bis(4-aminophenyl sulfide)benzene, 1,4-bis(4-aminophenyl sulfide)benzene, 1,3-bis(3-aminophenyl sulfone)benzene, 1,3-bis(4-aminophenyl sulfone)benzene, 1,4-bis(4-aminophenyl sulfone)benzene, 1,3-bis[2-(4-aminophenyl)isopropyl]benzene, 1,4-bis[2-(3-aminophenyl)isopropyl]benzene, 1,4-bis[2-(4-aminophenyl)isopropyl]benzene, and so on.

Examples of the diamine having four benzene nuclei (iv) include 3,3'-bis(3-aminophenoxy)biphenyl, 3,3'-bis(4-aminophenoxy)biphenyl, 4,4'-bis(3-aminophenoxy)biphenyl, 4,4'-bis(4-aminophenoxy)biphenyl, bis[3-(3-aminophenoxy)phenyl]ether, bis[3-(4-aminophenoxy)phenyl]ether, bis[4-(3-aminophenoxy)phenyl]ether, bis[4-(4-aminophenoxy)phenyl]ether, bis[3-(3-aminophenoxy)phenyl]ketone, bis[3-(4-aminophenoxy)phenyl]ketone, bis[4-(3-aminophenoxy)phenyl]ketone, bis[4-(4-aminophenoxy)phenyl]ketone, bis[3-(3-aminophenoxy)phenyl]sulfide, bis[3-(4-aminophenoxy)phenyl]sulfide, bis[4-(3-aminophenoxy)phenyl]sulfide, bis[4-(4-aminophenoxy)phenyl]sulfide, bis[3-(3-aminophenoxy)phenyl]sulfone, bis[3-(4-aminophenoxy)phenyl]sulfone, bis[4-(3-aminophenoxy)phenyl]sulfone, bis[4-(4-aminophenoxy)phenyl]sulfone, bis[3-(3-aminophenoxy)phenyl]methane, bis[3-(4-aminophenoxy)phenyl]methane, bis[4-(3-aminophenoxy)phenyl]methane, bis[4-(4-aminophenoxy)phenyl]methane, 2,2-bis[3-(3-aminophenoxy)phenyl]propane, 2,2-bis[3-(4-aminophenoxy)phenyl]propane, 2,2-bis[4-(3-aminophenoxy)phenyl]propane, 2,2-bis[4-(4-aminophenoxy)phenyl]propane, 2,2-bis[3-(3-aminophenoxy)phenyl]-1,1,1,3,3,3-hexafluoropropane, 2,2-bis[3-(4-aminophenoxy)phenyl]-1,1,1,3,3,3-hexafluoropropane, 2,2-bis[4-(3-aminophenoxy)phenyl]-1,1,1,3,3,3-hexafluoropropane, 2,2-bis[4-(4-aminophenoxy)phenyl]-1,1,1,3,3,3-hexafluoropropane, and so on.

Of these, an aromatic diamine compound is preferable, and one or more members selected from benzenediamine, diaminodiphenyl ether, and bis(aminophenoxy)benzene are more preferable. Suitable examples thereof include p-phenylenediamine, 3,3'-diaminodiphenyl ether, 3,4'-diaminodiphenyl ether, 4,4'-diaminodiphenyl ether (DADE), 1,3-bis(3-aminophenyl)benzene, 1,3-bis(4-aminophenyl)benzene, 1,4-bis(3-aminophenyl)benzene, 1,4-bis(4-aminophenyl)benzene, 1,3-bis(4-aminophenoxy)benzene, 1,4-bis(3-aminophenoxy)benzene, and so on.

The diamine component can be used singly or in combination of two or more kinds thereof.

From the viewpoints of mechanical characteristics, long-term heat resistance, flame retardancy, and the like, as a combination of the tetracarboxylic acid component and the diamine component of the polyimide, a polyimide obtained from (1) a tetracarboxylic acid component containing, as a main component, a component selected from 3,3',4,4'-biphenyltetracarboxylic dianhydride and pyromellitic dianhydride in an amount of preferably 70% by mole or more, more preferably 80% by mole or more, and especially preferably 90% by mole or more in 100% by mole of the tetracarboxylic acid component; and (2) a diamine component containing, as a main component, a component selected from p-phenylenediamine, 4,4'-diaminodiphenyl ether (DADE), 3,4'-diaminodiphenyl ether, 3,3'-diaminodiphenyl ether, o-tolidine, m-tolidine, 4,4'-diaminobenzanilide, 1,3-bis(3-aminophenyl)benzene, 1,3-bis(4-aminophenyl)benzene, 1,4-bis(3-aminophenyl)benzene, 1,4-bis(4-aminophenyl)benzene, 1,3-bis(4-minophenoxy)benzene, and 1,4-bis(3-aminophenoxy)benzene in an amount of preferably 70% by mole or more, more preferably 80% by mole or more, and especially preferably 90% by mole or more in 100% by mole of the diamine component is preferable.

More specific examples of the combination of the acid component and the diamine component constituting a preferred polyimide include (1) a combination of 3,3',4,4'-biphenyltetracarboxylic dianhydride with p-phenylenediamine or p-phenylenediamine and a diaminodiphenyl ether (4,4'-diaminodiphenyl ether or 3,4'-diaminodiphenyl ether);

(2) a combination of 3,3',4,4'-biphenyltetracarboxylic dianhydride and pyromellitic dianhydride with p-phenylenediamine or p-phenylenediamine and a diaminodiphenyl ether (4,4'-diaminodiphenyl ether or 3,4'-diaminodiphenyl ether);

(3) a combination of pyromellitic dianhydride with p-phenylenediamine and a diaminodiphenyl ether (4,4'-diaminodiphenyl ether or 3,4'-diaminodiphenyl ether); and so on.

The polyimide obtained from such a combination is suitably used as a raw material for electronic components such as a printed wiring board, a flexible printed board, a TAB or COF tape, a cover sheet, a reinforcing sheet, and the like and is preferable because it has excellent mechanical characteristics, long-term heat resistance, excellent hydrolysis resistance, a high thermal decomposition starting temperature, and excellent flame retardancy.

(Production of Polyamic Acid Solution)

The polyamic acid solution may be a solution obtained by subjecting a tetracarboxylic dianhydride and a diamine to a polymerization reaction in the presence of an organic polar solvent, or may be a solution obtained by dissolving a polyamic acid in an organic polar solvent.

Though the solvent is not particularly limited, examples thereof include organic polar solvents such as N-methyl-2-pyrrolidone (NMP), N,N-dimethylacetamide (DMAc), N,N-dimethylformamide, dimethyl sulfoxide, tetramethylurea, and the like; and so on, with N-methyl-2-pyrrolidone (NMP), N,N-dimethylacetamide (DMAc), and the like being preferable.

The production of the polyamic acid can be achieved by, for example, polymerizing the tetracarboxylic acid component and the diamine components in approximately equal moles. A polymerization temperature thereof is a temperature of preferably not higher than about 100° C., more preferably not higher than 80° C., still more preferably from 0 to 60° C., and especially preferably from 20 to 60° C.; and a polymerization time thereof is preferably about 0.2 hours or more, and more preferably from 0.3 to 60 hours.

At the time of producing the polyamic acid, an arbitrary molecular weight modifier can be added.

In performing the polymerization reaction of the polyamic acid, a solution viscosity may be properly chosen depending upon a purpose of the use (coating, casting, etc.) or a purpose of the production. From the viewpoint of workability, it is desirable that the polyamic acid solution (polyimide precursor solution) has a rotational viscosity, as measured at 30° C., of from about 0.1 to 5,000 poises, preferably from 0.5 to 2,000 poises, and more preferably from 1 to 2,000 poises. In consequence, it is preferable that the polymerization reaction is carried out to an extent that the formed polyamic acid exhibits the foregoing viscosity.

In performing the polymerization reaction of the polyamic acid, a concentration of the whole of monomers in the solvent may be properly chosen depending upon a purpose of the use or a purpose of the production. For example, it is desirable that the polyamic acid solution has a concentration of the whole of monomers in the solvent of preferably from 5 to 40% by mass, more preferably from 6 to 35% by mass, and still more preferably from 10 to 30% by mass.

Even when a part of the polyamic acid is imidized, it can be used within the range where it does not influence the present invention. That is, the polyamic acid may be partially thermally-imidized or chemically-imidized.

In the case where the polyamic acid is thermally-imidized, if desired, a fine particle of an imidization catalyst, an organic phosphorus-containing compound, an inorganic fine particle, an organic fine particle, etc., or the like can be added to the polyamic acid solution. Furthermore, in the case where the polyamic acid is chemically-imidized, if desired, a fine particle of a chemical imidizing agent, a dehydrating agent, an inorganic fine particle, an organic fine particle, etc., or the like can be added to the polyamic acid. It is preferable that the imidization is performed under such a condition that even when the foregoing component is blended in the polyamic acid solution, the coloring precursor does not deposit.

Examples of the imidization catalyst include a substituted or unsubstituted nitrogen-containing heterocyclic compound, an N-oxide compound of the nitrogen-containing heterocyclic compound, a substituted or unsubstituted amino acid compound, and a hydroxyl group-containing aromatic hydrocarbon compound or aromatic heterocyclic compound. More specifically, lower alkyl imidazoles such as 1,2-dimethylimidazole, N-methylimidazole, N-benzyl-2-methylimidazole, 2-methylimidazole, 2-ethyl-4-imidazole, 5-methylbenzimidazole, and the like; benzimidazoles such as N-benzyl-2-methylimidazole and the like; isoquinoline; substituted pyridines such as 3,5-dimethylpyridine, 3,4-dimethylpyridine, 2,5-dimethylpyridine, 2,4-dimethylpyridine, 4-n-propylpyridine, and the like; and so on can be suitably used.

A use amount of the imidization catalyst is preferably from 0.01 to 2 times by equivalent, and especially preferably from 0.02 to 1 time by equivalent to the amide acid unit of the polyamic acid. The use of the imidization catalyst is preferable because physical properties of the obtained polyimide film, particularly elongation and tear resistance, are enhanced.

Examples of the organic phosphorus-containing compound include phosphates such as monocaproyl phosphate, monooctyl phosphate, monolauryl phosphate, monomyristyl phosphate, monocetyl phosphate, monostearyl phosphate, a monophosphate of triethylene glycol monotridecyl ether, a monophosphate of tetraethylene glycol monolauryl ether, a monophosphate of diethylene glycol monostearyl ether, dicaproyl phosphate, dioctyl phosphate, dicapryl phosphate, dilauryl phosphate, dimyristyl phosphate, dicetyl phosphate, distearyl phosphate, a diphosphate of tetraethylene glycol mononeopentyl ether, a diphosphate of triethylene glycol monotridecyl ether, a diphosphate of tetraethylene glycol monolauryl ether, a diphosphate of diethylene glycol monostearyl ether, and the like; and amine salts of these phosphates. Examples of the amine include ammonia, monomethylamine, monoethylamine, monopropylamine, monobutylamine, dimethylamine, diethylamine, dipropylamine, dibutylamine, trimethylamine, triethylamine, tripropylamine, tributylamine, monoethanolamine, diethanolamine, triethanolamine, and the like.

Examples of the inorganic fine particle include inorganic oxide powders such as finely particulate titanium dioxide power, silicon dioxide (silica) powder, magnesium oxide powder, aluminum oxide (alumina) powder and zinc oxide powder, and the like; inorganic nitride powders such as finely particulate silicon nitride powder and titanium nitride powder, and the like; inorganic carbide powders such as a silicon carbide powder and the like; and inorganic salt powders such as finely particulate calcium carbonate powder, calcium sulfate powder and barium sulfate powder, and the like. In order to uniformly disperse such inorganic fine particles, a known dispersion means can be applied.

As the organic fine particle, organic fine particles which are insoluble in a solvent and which, even when heated at 250° C. or higher, are not modified can be exemplified, and examples thereof include a polyimide particle, a polyamide particle, a crosslinking particle, and so on.

Each of the imidization catalyst, the organic phosphorus-containing compound, the inorganic fine particle, and the organic fine particle can be used singly or in combination of two or more kinds thereof.

Examples of the chemical imidizing agent include aliphatic tertiary amines such as trimethylamine, triethylenediamine, and the like; aromatic tertiary amines such as dimethylaniline and the like; heterocyclic tertiary amines such as isoquinoline, pyridine, 2-methylpyridine, 3-methylpyridine, 4-methylpyridine, imidazole, benzimidazole, and the like; and so on. Of these, heterocyclic tertiary amines are preferable, and 3-methylpyridine, 4-methylpyridine, imidazole, and benzimidazole are more preferable.

Examples of the dehydrating agent of water which is formed following the imidization reaction include fatty acid anhydrides such as acetic anhydride, propionic anhydride, butyric anhydride, and the like; aromatic acid anhydrides such as benzoic anhydride, phthalic anhydride, and the like; and so on. Of these, fatty acid anhydrides are preferable, and acetic anhydride is more preferable.

(Coloring Precursor)

The coloring precursor as referred to in the present invention means a precursor, a part or all of which is carbonized by a thermal treatment at 250° C. or higher, thereby forming a colorized material.

As the coloring precursor which is used in the present invention, a material which is uniformly dissolved in the polyamic acid solution or the polyimide solution and thermally decomposed and carbonized by a thermal treatment at 250° C. or higher, preferably 260° C. or higher, more preferably 280° C. or higher, and still more preferably 300° C. or higher, and preferably a thermal treatment at 250° C. or higher, preferably 260° C. or higher, more preferably 280° C. or higher, and still more preferably 300° C. or higher in the presence of oxygen such as air and the like, thereby forming a colorized material is preferable; a material capable of forming a colorized material in a black based color is more preferable; and a carbon based coloring precursor is still more preferable.

When heating is advanced, the coloring precursor is seen as a carbonized material at glance; however, it contains foreign elements other than carbon from the structural standpoint and includes a layer structure, an aromatic cross-linking structure, and a disordered structure containing tetrahedral carbon.

The carbon based coloring precursor is not particularly limited, and examples thereof include tars or pitches such as petroleum tar, petroleum pitch, coal tar, coal pitch, and the like; cokes; polymers obtained from an acrylonitrile-containing monomer; ferrocene compounds (ferrocene and ferrocene derivatives); and so on. Of these, polymers obtained from an acrylonitrile-containing monomer and/or ferrocene compounds are preferable, and polyacrylonitrile is preferable as the polymer obtained from an acrylonitrile-containing monomer.

Ferrocene ($C_{10}H_{10}Fe$) is di-π-cyclopentadienyl iron, and though it is carbonized itself by heating, it may be considered that it has an effect for promoting carbonization of the polyamic acid, too. As the ferrocene, marketed products by Wako Pure Chemical Industries, Ltd. can be used.

The ferrocene derivative as referred to in the present invention means a di-π-cyclopentadienyl iron complex, and there are exemplified those in which a substituent of various sort is bonded as a pendant group of the cyclopentadienyl ring. Examples thereof include bis(indenyl)iron (II) (dibenzferrocene), 1,1'-diacetylferrocene, 1,2-diacetylferrocene, 1,1-diferrocenylethane, dimethylaminoethylferrocene, methylaminomethylferrocene, ferrocenylacetonitrile, ferrocenylcarbonal, ferrocenesulfonic acid, 1,2-diferrocenylethane, diferrocenylmethane, phenylferrocene, ferrocenecarboxyaldehyde, Ω-ferrocenyl fatty acids, phenylcyclopentaferrocene, 1,1'-(1,3-cyclopentylene)ferrocene, phenylcyclopentylferrocene, benzoylferrocene, acetylferrocene, and so on. Furthermore, heterocyclic π-complexes such as azaferrocene can also be used.

(Polyamic Acid Solution Composition)

The polyamic acid solution composition is a solution composition obtained by uniformly dissolving the coloring precursor in the polyamic acid solution. Incidentally, the polyamic acid solution composition is preferably a suspension liquid or a transparent uniform solution.

The polyamic acid solution composition can be produced by a method of adding and mixing the coloring precursor in the polyamic acid solution; a method of previously adding the coloring precursor to the solvent prior to polymerization of the polyamic acid and then performing polymerization; a method of adding the coloring precursor during polymerization of the polyamic acid and performing polymerization; or the like.

A blending amount of the coloring precursor, particularly the carbon based coloring precursor, which is contained in the polyamic acid solution composition, may be properly chosen depending upon a desired coloring amount, and it is desirable that the coloring precursor is blended in an amount of preferably from 1 to 60 parts by mass, more preferably from 1 to 40 parts by mass, still more preferably from 2 to 40 parts by mass, even still more preferably from 2 to 30 parts by mass, and especially preferably from 3 to 25 parts by mass based on 100 parts by mass of the obtained polyimide. Even when the coloring precursor is blended in an amount of 60 parts by mass or more, the coloring effect is obtained; however, such is not preferable because there may be the case where membrane characteristics, particularly dynamic characteristics of the obtained colored polyimide molded article are lowered depending upon the kind of the coloring precursor.

<Second Invention>

The second invention comprises the step of molding a polyimide solution composition containing a polyimide solution and a coloring precursor; and then thermally treating a molded product at 250° C. or higher.

(Production of Polyimide/Polyimide Solution)

As the polyimide which is used in the second invention, a polyimide which is dissolved in a solvent at a molding temperature can be used, and by selecting and combining a tetracarboxylic acid component and a diamine component and polymerizing the mixture in a solvent, a polyimide which is soluble in the solvent can be obtained.

The tetracarboxylic acid component and the diamine component, both of which constitute the polyimide, are the same as those described above, and a suitable combination of the tetracarboxylic acid component and the diamine component is also the same as that described above.

Examples of the solvent for polymerizing the polyimide include organic polar solvents such as N-methyl-2-pyrrolidone (NMP), N,N-dimethylacetamide (DMAc), N,N-dimethylformamide, dimethyl sulfoxide, tetramethylurea, and the like; and so on. Of these, N-methyl-2-pyrrolidone (NMP), N,N-dimethylacetamide (DMAc), phenols such as phenol, p-chlorophenol, o-chlorophenol, cresol, and the like, and so on are preferable.

The production of the polyimide can be achieved by, for example, polymerizing the tetracarboxylic acid component and the diamine components in approximately equal moles. A polymerization temperature thereof is preferably 130° C. or higher, more preferably from 150 to 250° C., and still more preferably from 170 to 230° C.; and a polymerization time thereof is preferably about 0.2 hours or more, and more preferably from 0.3 to 60 hours.

At the time of producing the polyimide, an arbitrary molecular weight modifier can be added.

In performing the polymerization reaction of the polyimide, a solution viscosity may be properly chosen depending upon a purpose of the use (coating, casting, etc.) or a purpose of the production. From the viewpoint of workability, it is desirable that the polyimide solution has a rotational viscosity, as measured at a temperature at the time of molding, of from about 0.1 to 5,000 poises, preferably from 0.5 to 2,000 poises, and more preferably from 1 to 2,000 poises. In consequence, it is preferable that the polymerization reaction is carried out to an extent that the formed polyimide exhibits the foregoing viscosity.

In performing the polymerization reaction of the polyimide, a concentration of the whole of monomers in the solvent may be properly chosen depending upon a purpose of the use or a purpose of the production. For example, it is desirable that the polyimide solution has a concentration of the whole of monomers in the solvent of preferably from 5 to 30% by mass, more preferably from 6 to 25% by mass, and still more preferably from 10 to 20% by mass.

(Polyimide Solution Composition)

The polyimide solution composition is a solution composition obtained by uniformly dissolving the coloring precursor in the polyimide solution at a temperature at the time of molding. Incidentally, the polyimide solution composition is preferably a suspension liquid or a transparent uniform solution.

The polyimide solution composition can be produced by a method of adding and mixing the coloring precursor in the polyimide solution; a method of previously adding the coloring precursor to the solvent prior to polymerization of the polyimide and then performing polymerization; a method of adding the coloring precursor during polymerization of the polyimide and performing polymerization; or the like.

A blending amount of the coloring precursor contained in the polyimide solution composition may be properly chosen depending upon a desired coloring amount, and it is desirable that the coloring precursor is blended in an amount of preferably from 1 to 60 parts by mass, more preferably from 2 to 40 parts by mass, and still more preferably from 2 to 30 parts by mass based on 100 parts by mass of the obtained polyimide. Even when the coloring precursor is blended in an amount of 60 parts by mass or more, the coloring effect is obtained; however, such is not preferable because there may be the case where membrane characteristics, particularly dynamic characteristics of the obtained colored polyimide molded article are lowered depending upon the kind of the coloring precursor.

In the case where the polyimide solution is thermally-imidized, if desired, a fine particle of an imidization catalyst, an organic phosphorus-containing compound, an inorganic fine particle, an organic fine particle, etc., or the like can be added to the polyimide solution. It is preferable that the imidization is performed under such a condition that even when the foregoing component is blended in the polyimide solution, the coloring precursor does not deposit.

The imidization catalyst, the organic phosphorus-containing compound, the inorganic fine particle, and the organic fine particle are the same as those described above, and each of them may be used singly or in combination of two or more kinds thereof.

<Molding of Polyamic Acid Solution Composition or Polyimide Solution Composition>

In the first invention and the second invention, a molding method of each of the polyamic acid solution composition and the polyimide solution composition is not particularly limited, and such a composition can be molded into a membrane form, a film form, a sheet form, a fibrous form, a tubular form, or the like by adopting a known procedure. More specifically, the following methods (i) to (iii) and the like are exemplified.

(i) A method of casting the polyamic acid solution composition or the polyimide solution composition on a substrate, evaporating the solvent by heat drying or drying under reduced pressure, or the like, and then separating a film or a sheet from the substrate.

(ii) A method of cutting a molded article in a film or sheet form obtained by the foregoing method (i) or the like into prescribed length and width, followed by joining together, to obtain a belt or a tube.

(iii) A method of coating the polyamic acid solution composition or the polyimide solution composition on an inner surface or outer surface of a cylindrical die, evaporating the solvent, heating the residue as is or once separating it, and fitting the resultant onto the periphery of another die for specifying an inner diameter, followed by heating, to obtain an endless or tubular molded article.

<Production (1) of Colored Polyimide Molded Article (Molding and Thermal Treatment)>

As specific examples of the production process of the colored polyimide molded article using the polyamic acid solution composition, the following (1) and (2) and the like can be exemplified.

(1) A method of molding the polyamic acid solution composition into a film form or the like and thermally heating a molded product at 250° C. or higher, and if desired, at a maximum heating temperature of from 350 to 600° C. while gradually removing a part or the whole of the solvent, thereby achieving imidization and coloration.

(2) A method of molding the polyamic acid solution composition into a film form or the like, heating the molded article at a temperature at which the coloring precursor is not colored, preferably from 50 to 210° C., and more preferably from 60 to 200° C., gradually removing a part or the whole of the solvent to achieve pre-drying (if the molded article is in a film form, pre-drying is performed until it has self-supporting properties such that it can be separated from a support), and thereafter, thermally heating the resultant at 250° C. or higher, and if desired, at a maximum heating temperature of from 350 to 600° C., thereby achieving imidization and coloration.

An example of producing a film from the polyamic acid solution composition by thermal imidization is shown. The polyamic acid solution composition is cast on a surface of a suitable support (for example, a roll made of a metal, a ceramic, or a plastic; a metallic belt; or a roll or belt onto which a metal thin membrane tape is being fed), thereby forming a polyamic acid solution having a uniform thickness of from about 10 to 2,000 μm, and particularly from about 20 to 1,000 μm in a membrane state. Subsequently, the resultant is heated at from 50 to 210° C., and particularly from 60 to 200° C. by utilizing a heat source such as hot air, infrared rays, and the like, the solvent is gradually removed and at the same time, a part of the polyamic acid is imidized, thereby the film is pre-dried until it has self-supporting properties and the self-supporting film is separated from the support.

Subsequently, the separated self-supporting film is thermally treated at a temperature of 250° C. or higher, preferably from 280 to 600° C., more preferably from 310 to 590° C., still more preferably from 320 to 580° C., and especially preferably from 350 to 500° C.

A thermal treatment time may be properly chosen depending upon a combination of the acid component and the diamine component, both of which constitute the polyamic acid. The thermal treatment can be performed under a multi-stage condition. In heating at 250° C. or higher, it is preferable to perform the thermal treatment while fixing the both ends or the entirety by a pin tenter, a clip, a frame, or the like, or the both end edges in the rectangular direction to the longitudinal direction in the case of a long film. The thermal treatment can be performed using a known apparatus of various sorts such as an air heating furnace, an infrared heating furnace, and the like. A heating time can be properly chosen, and it is preferably from 5 to 120 minutes, and more preferably from 5 to 60 minutes. The imidization and/or the coloration is advanced by this thermal treatment.

The foregoing methods can also be applied to the polyimide solution composition.

<Production (2) of Colored Polyimide Molded Article (Molding and Thermal Treatment)>

As specific examples of the production process of the colored polyimide molded article using the polyimide solution composition, the following (1) and (2) and the like can be exemplified.

(1) A method of molding the polyimide solution composition into a film form or the like and thermally heating at 250° C. or higher, and preferably at a maximum heating temperature of from 350 to 600° C. while gradually removing a part or the whole of the solvent, thereby achieving coloration.

(2) A method of molding the polyimide solution composition into a film form or the like, heating the molded article at a temperature at which the coloring precursor is not colored, preferably from 50 to 210° C., and more preferably from 60 to 200° C., gradually removing a part or the whole of the solvent to achieve pre-drying until it has self-supporting properties, and thereafter, thermally heating the resultant at 250° C. or higher, at which the coloring precursor is colored, and preferably at a maximum heating temperature of from 350 to 600° C., thereby achieving coloration.

According to the production process of the present invention, the colored polyimide molded article having controlled light screening properties can be efficiently obtained. This colored polyimide molded article can be suitably used as, for example, a raw material for electronic components or electronic appliances such as a printed wiring board, a flexible printed board, a TAB tape, a COF tape, a cover film, a reinforcing film, a belt, e.g., a drive belt, etc., a tube, and the like, or a coating material of a molded article such as a metallic molded article of a copper wire, etc., or the like.

<Third Invention>

The production process of a colored polyimide molded article of the third invention comprises a step of dipping a film obtained by casting a polyamic acid solution composition in a poor solvent against the polyamic acid to fabricate a porous polyamic acid film; and a step of thermally treating the porous polyamic acid film at 250° C. or higher.

The polyamic acid solution composition which is used in the third invention is the same as the polyamic acid solution composition which is used in the first invention.

In the polyamic acid solution which is used in the third invention, a limiting viscosity number (30° C., concentration: 0.5 g/100 mL, solvent: NMP) of the polyamic acid solution may be a viscosity at which the polyimide porous membrane of the present invention can be produced. In the process of the present invention, it is preferably to use a polyamic acid whose limiting viscosity number is preferably 0.3 or more, more preferably from 0.5 to 5, and still more preferably from 0.5 to 7.

A concentration of the polymer contained in the polyamic acid solution which is used in the third invention is not particularly limited so far as it is a concentration at which the polymer comes into contact with the poor solvent and deposits to obtain a polyamic acid porous material, and it is preferably composed of from 0.3 to 60% by mass (solid concentration) of the polyamic acid and from 40 to 99.7% by mass of the organic polar solvent. When the solid concentration of the polyamic acid is less than 0.3% by mass, in fabricating a porous polyimide film, the film strength is lowered, whereas when it exceeds 60% by mass, there may be the case where substance permeability of the porous polyimide membrane is lowered. The solid concentration of the polyamic acid in the polyamic acid solution which is used in the third invention is more preferably from 1 to 40% by mass, still more preferably from 3 to 30% by mass, and especially preferably from 5 to 15% by mass; and the content of the organic polar solvent is more preferably from 60 to 99% by mass, still more preferably from 70 to 97% by mass, and especially preferably from 85 to 95% by mass.

As the coloring precursor which is used in the third invention, a material which is uniformly dissolved in the polyamic acid solution, is not substantially dissolved in the poor solvent, and is thermally decomposed and carbonized by a thermal treatment at 250° C. or higher, and preferably a thermal treatment at 250° C. or higher in the presence of oxygen such as air and the like, to form a colorized material is preferable; a material capable of forming a colorized material in a black based color is more preferable; and a carbon based coloring precursor is still more preferable.

Preferred specific examples of the coloring precursor which is used in the third invention are the same as the preferred specific examples of the coloring precursor which is used in the first invention.

<Fabrication of Film of Polyamic Acid Solution Composition>

In the production process of a porous polyimide of the present invention, the above-obtained polyamic acid solution and the coloring precursor are first mixed to prepare a polyamic acid solution composition having the coloring precursor uniformly dissolved in the polyamic acid solution, which is then cast on a substrate to fabricate a film.

In the case of performing chemical imidization, a catalyst and a dehydrating agent are mixed with the polyamic acid solution composition, and at the same time, this is cast on a substrate, whereby a film can be fabricated.

(Casting)

A casting method is not particularly limited, and for example, the polyamic acid solution composition can be cast in a film form on a substrate such as a glass plate, a stainless steel plate, and the like by using a T-die, a comma coater, a blade, etc. Furthermore, a film piece part or a long film can be continuously produced by intermittently or continuously casting the polyamic acid solution composition in a film form on a continuously movable belt. The belt may be one which is not influenced by the polyamic acid solution composition and a poor solvent as described later, and a belt made of a metal such as stainless steel and the like, or a belt made of a resin such as polytetrafluoroethylene and the like, can be used. Furthermore, the polyamic acid solution composition molded in a film form can also be thrown into the poor solvent as it is. Furthermore, if desired, one surface or both surfaces of the obtained material in a film form may be brought into contact with a gas containing a water vapor, etc. (air, an inert gas, etc.), a porous material made of a polyolefin or a fluorine based polyolefin, a mixed solution of a poor solvent and a solvent, or the like.

As for the solution viscosity (at 30° C.) of the polyamic acid solution composition, a viscosity at which not only the polyamic acid solution composition can be cast in a film form, but the polyamic acid deposits can be properly determined. From the viewpoints of easiness of casting and film strength, the solution viscosity (at 30° C.) is preferably from 10 to 10,000 poises (1 to 1,000 Pa·s), more preferably from 100 to 3,000 poises (10 to 300 Pa·s), still more preferably from 200 to 2,000 poises (20 to 200 Pa·s), and especially preferably from 300 to 2,000 poises (30 to 200 Pa·s). Incidentally, the solution viscosity (at 30° C.) is measured by the method as described in the Examples.

<Fabrication of Porous Polyamic Acid Film>

The porous polyamic acid film can be obtained by bringing the foregoing film (non-stretched) obtained by casting the polyamic acid solution composition into contact with the poor solvent against the polyamic acid by means of dipping or the like, thereby making the film porous. The porous polyamic acid film can be obtained by substituting the good solvent in the polyamic acid solution composition with a poor solvent to cause a phase separation phenomenon of the polyamic acid and if desired, further cleaning and/or drying.

After the obtained porous polyamic acid film is cleaned and/or dried, if desired, the film is thermally-imidized by a heat treatment at 250° C. or higher, thereby achieving coloration and imidization at the same time. There can be thus formed a colored polyimide porous membrane. It is preferable that this colored polyimide porous membrane is colored from a black based color to a brown based color.

The film (non-stretched) obtained by casting the polyamic acid solution composition, prior to the contact with the poor solvent, can be subjected to (i) bringing one surface or both surfaces of the film into contact with a water vapor or a gas containing an organic vapor of an alcohol, etc. (for example, air, etc.) (the contact time is preferably within 5 minutes, more preferably within 3 minutes, and still more preferably within 2 minutes); (ii) bringing one surface or both surfaces of the film with a polymerization solvent (which may contain a poor solvent); or (iii) laminating a porous film such as a polyolefin and the like on one surface or both surfaces of the film, as the need arises.

It is preferable that the porous film which can be laminated on the film obtained by casting the polyamic acid solution composition has the following properties.
(1) It can be easily separated from the deposited polyamic acid.
(2) It has permeability to an extent that a polyamic acid solvent such as N-methyl-2-pyrrolidone (NMP), N,N-dimethylacetamide (DMAc), and the like and a deposition solvent such as water, an alcohol, and the like are able to permeate therethrough at an appropriate rate, has a suitable affinity with such solvents, and has a structure in which pores of from 0.1 to several μm are dispersed in a sufficient density.
(3) At least one surface thereof has smoothness to an extent required for a porous membrane which is intended to be fabricated, or more.
(4) It has rigidity to an extent that when the polyamic acid solution is dipped, wrinkles are not generated.

As the porous film, porous films made of a polyolefin such as polyethylene, polypropylene, and the like, Teflon (a registered trademark), or the like and having a pore size of from 0.1 to 5 μm and a thickness of from 10 to 100 μm are suitably used.

(Poor Solvent Against Polyamic Acid)

As the poor solvent against the polyamic acid, those which are miscible with the polymerization solvent used for the polymerization of the polyamic acid can be used. Examples thereof include water; organic solvents such as alcohols, e.g., methanol, ethanol, isopropyl alcohol, ethylene glycol, triethylene glycol, 2-butyl alcohol, 2-propyl alcohol, 2-hexyl alcohol, cyclopentyl alcohol, cyclohexyl alcohol, phenol, t-butyl alcohol, etc., ketones, e.g., acetone, methyl ethyl ketone, methyl isobutyl ketone, diethyl ketone, etc., aromatic hydrocarbons, e.g., toluene, xylene, etc.; and so on.

Of these, from the viewpoints of safety and uniformity of the obtained porous film, water alone or a mixed solvent of water and a poor solvent such as an aliphatic alcohol having a carbon number of from 1 to 3, e.g., methanol, ethanol, isopropyl alcohol, etc., a ketone having a carbon number of from 3 to 6, and the like is preferable.

If desired, the poor solvent can be used as a mixed solvent with the polymerization solvent used for the polymerization of the polyamic acid.

In the case of using, as the poor solvent, a mixed solvent of water and the foregoing organic solvent, a content of water in the mixed solvent is preferably 5% by mass or more and less than 100% by mass, more preferably 20% by mass or more and less than 100% by mass, still more preferably from 30 to 95% by mass, and especially preferably from 45 to 90% by mass. A content of the organic solvent (poor solvent) in the mixed solvent is preferably more than 0% by mass and not more than 95% by mass, more preferably more than 0% by mass and not more than 80% by mass, still more preferably from 3 to 60% by mass, and especially preferably from 5 to 30% by mass.

A temperature of the poor solvent is usually from −30 to 70° C., preferably from 0 to 60° C., and more preferably from 10 to 50° C.

(Porous Polyamic Acid Film)

The obtained porous polyamic acid film can be properly adjusted with respect to a membrane thickness, a porosity, an average pore size, and the like by properly choosing the kind of the polyamic acid to be used, the solid concentration of the polyamic acid solution, the solution viscosity of the polyamic acid solution composition, the organic solvent, the solidification condition (temperature, kind of the poor solvent, etc.), and the like.

According to the production process of the present invention, porous polyamic acid films having various forms can be obtained. For example, there are exemplified porous polyamic acid films having the following forms (1) to (4) as the representative form.

Form (1): A homogeneous porous film having no minute surface layer on both surfaces thereof and substantially free from voids (large pores) in the membrane inside.

Form (2): A porous film of a three-layered structure having two surface layers and a macrovoid layer interposed therebetween and having a so-called honeycomb sandwich structure, wherein the macrovoid layer has plural macrovoids surrounded by the surface layers and partitions coupled with the surface layers and plural pores, and the pores and the macrovoids are communicated with each other.

In the case of fabricating the film of the form (2), it is necessary to allow the polyamic acid solution composition to previously contain a polar group-containing organic compound in an amount of from 1 to 150 parts by mass, preferably from 10 to 100 parts by mass, and more preferably from 20 to 70 parts by mass based on 100 parts by mass of the polyamic acid. The polar group-containing organic compound is preferably a carboxyl group-containing organic compound such as benzoic acid, phthalic acid, and the like.

Form (3): A symmetric or asymmetric porous film having a minute surface layer on one surface or both surfaces thereof and substantially free from voids (large pores) in the membrane inside.

Form (4): A symmetric or asymmetric porous film having a minute surface layer on one surface or both surfaces thereof and having a lot of voids (large pores) in the membrane inside.

The fabrication of a colored polyimide porous membrane using the porous polyamic acid film of the form (1) or (2) is described later.

<Thermal Treatment of Porous Polyamic Acid Film>

The colored polyimide porous membrane of the present invention can be obtained by thermally treating the foregoing porous polyamic acid film at 250° C. or higher.

In order to suppress adverse influences such as impairment of smoothness of the film to be caused due to thermal contraction, and the like, the thermal treatment can be, for example, performed by fixing a part or the whole of ends, and preferably both ends or the entirety of ends (periphery) of the porous polyamic acid film to the support by using a pin, a chuck, a pinch roll, or the like and heating the film in the air. A heating temperature is preferably from 280 to 500° C., more preferably from 300 to 480° C., and still more preferably from 330 to 450° C. Though a heating time can be properly chosen, it is preferably from 5 to 120 minutes, and more preferably from 5 to 60 minutes. The imidization and/or the coloration is advanced by this thermal treatment.

Water produced following the imidization reaction can be removed out the reaction system together with a heating gas flow.

The polyimide constituting the obtained colored polyimide porous membrane is a heat-resistant polymer having an imidization ratio by the IR measurement of preferably 70% or more, more preferably 80% or more, still more preferably 85% or more, yet still more preferably 90% or more, and especially preferably 95% or more.

Incidentally, a chemical imidization treatment can also be performed prior to this thermal treatment.

From the viewpoints of reaction rate, suppression of a viscosity increase, molecular weight control, and the like, the chemical imidization can be performed in the presence of a catalyst and a dehydrating agent at usually from 20 to 200° C., preferably from 25 to 150° C., and more preferably from 30 to 100° C.

Examples of the catalyst include aliphatic tertiary amines such as trimethylamine, triethylenediamine, and the like; aromatic tertiary amines such as dimethylaniline and the like; heterocyclic tertiary amines such as isoquinoline, pyridine, 2-methylpyridine, 3-methylpyridine, 4-methylpyridine, imidazole, benzimidazole, and the like; and so on. Of these, heterocyclic tertiary amines are preferable; and 3-methylpyridine, 4-methylpyridine, imidazole, and benzimidazole are more preferable.

Examples of the dehydrating agent include fatty acid anhydrides such as acetic anhydride, propionic anhydride, butyric anhydride, and the like; aromatic acid anhydrides such as benzoic anhydride, phthalic anhydride, and the like; and so on. Of these, fatty acid anhydrides are preferable; and acetic anhydride is more preferable.

According to the production process of the present invention, colored polyimide porous membranes of the following two representative forms can be fabricated using the foregoing porous polyamic acid film.

<Form (A): Fabrication of Colored Polyimide Porous Membrane>

On the porous polyamic acid film (non-stretched) of the foregoing form (1), (i) a protective solvent such as a polymerization solvent (which may contain a poor solvent) and the like is coated on one surface or both surfaces of the film, and if desired, it is further allowed to stand, or (ii) a porous film made of a polyolefin or the like is laminated on one surface or both surfaces of the film. Thereafter, the obtained laminate is brought into contact with a poor solvent against the polyamic acid by means of dipping or the like, thereby making the laminate porous. The porous polyamic acid film can be obtained by substituting the good solvent in the porous polyamic acid film with a poor solvent to cause a phase separation phenomenon of the polyamic acid and if desired, further cleaning and/or drying.

The obtained porous polyamic acid film is thermally treated at 250° C., whereby a colored polyimide porous membrane [form (A)] can be formed.

The colored polyimide porous membrane of the form (A) is a homogeneous porous film having no minute surface layer on both surfaces thereof and substantially free from voids (large pores) in the membrane inside. It is desirable that this porous membrane has a membrane thickness of preferably from 5 to 100 µm, and more preferably from 10 to 80 µm; has a porous structure having pores having an average pore size of preferably from 0.01 to 5 µm, more preferably from 0.02 to 2 µm and still more preferably from 0.03 to 1 µm on one surface or both surfaces thereof, in which the pores are non-linearly continued from one surface toward the other surface; has a porosity of preferably from 15 to 80%, more preferably from 20 to 70%, and still more preferably from 25 to 60%; and has a Gurley value (air permeability) of preferably from 30 to 1,000 seconds/100 cc, more preferably from 30 to 1,000 seconds/100 cc, and still more preferably from 30 to 120 seconds/100 cc.

<Form (B): Fabrication of Colored Polyimide Porous Membrane>

(i) The porous polyamic acid film (non-stretched) of the foregoing form (2) is allowed to stand in the air, (ii) on the film (non-stretched) obtained by casting the polyamic acid solution composition, a protective solvent such as a polymerization solvent (which may contain a poor solvent) and the like is coated on one surface or both surfaces of the film, or (iii) a porous film made of a polyolefin or the like is laminated on one surface or both surfaces of the film. Thereafter, the obtained laminate is brought into contact with a poor solvent against the polyamic acid by means of dipping or the like, thereby making the laminate porous. The porous polyamic acid film can be obtained by substituting the good solvent in the polyamic acid solution composition with a poor solvent to cause a phase separation phenomenon of the polyamic acid and if desired, further cleaning and/or drying.

The obtained porous polyamic acid film is thermally treated at 250° C., whereby a colored polyimide porous membrane [form (B)] can be formed.

The colored polyimide porous membrane of the form (B) is a porous polyimide membrane of a three-layered structure having two surface layers and a macrovoid layer interposed therebetween and is a porous membrane having a so-called honeycomb sandwich structure, wherein the macrovoid layer has plural macrovoids surrounded by the surface layers and partitions coupled with the surface layers and plural pores, and the pores and the macrovoids are communicated with each other. In each of the surface layers and the partitions of the macrovoid layer of the porous membrane, it is desirable that a thickness is preferably from 0.1 to 15 µm, more preferably from 1 to 12 µm and still more preferably from 2 to 10 µm; a total membrane thickness is preferably from 5 to 500 µm, more preferably from 10 to 300 µm, and still more preferably from 20 to 100 µm; an average pore size in the membrane plane direction of the macrovoids is preferably from 10 to 150 µm, more preferably from 10 to 100 µm, and still more preferably from 10 to 80 µm; an average pore size of the pores is preferably from 0.01 to 5 µm, more preferably from 0.01 to 3 µm, and still more preferably from 0.02 to 2 µm; a porosity is preferably from 70 to 95%, more preferably from 71 to 90%, and still more preferably from 72 to 85%; and a Gurley value (air permeability) is preferably not more than 100 seconds/100 cc, more preferably not more than 80 seconds/100 cc, and still more preferably not more than 50 seconds/100 cc.

Furthermore, in a section of the colored polyimide porous membrane cut vertically to the membrane plane direction, a number of macrovoids having a ratio (L/d) of a length (L) in the membrane plane direction to a length (d) in the membrane thickness direction in macrovoids having an average pore size in the membrane plane direction of 10 µm or more, which falls within the range of from 0.5 to 3, is preferably 60% or more, preferably 70% or more, and still more preferably from 73 to 100%.

Moreover, a rate of change in the membrane thickness after loading a compression stress of 0.5 MPa at 250° C. for 15 minutes is preferably not more than 5%, more preferably not more than 3%, and still more preferably from 0 to 1%.

Furthermore, a dimensional stability in the membrane plane direction at 200° C. for 2 hours in conformity with ASTM D1204 is preferably within ±1%.

Incidentally, the membrane thickness, the average pore size, the porosity, and the Gurley value are measured by the methods described in the Example.

EXAMPLES

The present invention is more specifically described below with reference to the Examples, but it should not be construed that the present invention is limited thereto. Incidentally, the measurement of a solution viscosity of a polyamic acid solution composition and the evaluation of a colored polyimide molded article (film) and a polyimide porous membrane were performed in the following methods.

I-1. Measurement of Solution Viscosity of Polyamic Acid Solution Composition:

A polyamic acid solution obtained by charging a polyamic acid solution composition in a closed vessel and keeping in a thermostat at 30° C. for 10 hours was used as a measuring solution and measured for a solution viscosity under a condition at a temperature of 30±0.1° C. by using an E-type viscometer (cone plate type rotary viscometer for high-viscosity use (EHD type), manufactured by Tokyo Keiki Inc., cone rotor: 1° 34'). The measurement was performed three times, and an average value was employed. In the case where a scattering of 5% or more was seen in the measured points, the measurement was performed additionally two times, and an average value of five points was employed.

I-2. Measurement Method of Limiting Viscosity Number:

The limiting viscosity number is synonymous with an intrinsic viscosity and is a limiting value of a reduced viscosity in infinite dilution of a polymer (a ratio $\eta r/c$ of an increase $\eta r$ of relative viscosity to a mass concentration c of a polymer) or an inherent viscosity (a ratio of a natural logarithm of relative viscosity to a mass concentration c of a polymer).

A molecular weight can be determined from the limiting viscosity number using the following Mark-Houwink equation (equation describing the molecular weight dependency of the intrinsic viscosity of a polymer):

$$[\eta]=K \times M_r^a$$

where $M_r$ is usually one of molecular weights; and a is a constant unequivocally determined by a polymer and the kind of a solvent.

In the present invention, in view of the facts that the polyamic acid is a substance which is unstable in the air and that its molecular weight is difficult to be determined by means of GPC or the like, the limiting viscosity number is used as an index of the molecular weight.

The measurement of the limiting viscosity number should be performed strictly by using a θ solvent and using a dilute solution in a θ state; however, the polyamic acid which is objective to the measurement has a large interaction with a solvent molecule, so it is difficult to fabricate a θ solvent. In the case of a polyamic acid, there are study reports showing that even when a good solvent is used for the measurement of a limiting viscosity number, the molecular weight can be calculated according to the Mark-Houwink equation, and therefore, in the present invention, the measurement was performed using N-methyl-2-pyrrolidone (hereinafter referred to as NMP) as a dilution solvent according to the following procedures.

(1) An NMP solution of a polyamic acid which is objective to the measurement was prepared such that a solution concentration c was 0.1, 0.075, 0.05, 0.025 and 0.010 [g/dL], respectively. The solution was subjected to a stirring operation in an anaerobic atmosphere continuously for one week.

(2) A flow time of NMP was measured in a thermostat at 30° C. by using an Ubbelohde's viscometer. Subsequently, each of the solutions as prepared above in (1) was also measured for the flow time. In all of the cases, the measurement was performed three times, and an average value was employed. In the case where a scattering of 3% or more was seen in the measured times, the measurement was performed additionally two times, and an average value of three points from the small value side was taken and employed.

A specific viscosity $\eta sp$ was calculated from the measured value, and a graph in which the y axis is $\eta sp/c$, and the x axis is c (Huggins plot) was prepared. The plot points were subjected to linear regression analysis by a graph software, and the limiting viscosity number was determined from an intercept of the regression line. In the case where R2 of the regression line was not more than 0.900, a solution was again prepared and remeasured.

II. Evaluation of Colored Polyimide Molded Article (Film) and Polyimide Porous Membrane:

(1) Membrane Thickness:

The membrane thickness of the porous membrane was measured using a contact type thickness meter.

(2) Porosity:

The membrane thickness and mass of the porous membrane having been cut out in a prescribed size were measured, and the porosity was determined from a basis mass according to the following equation:

$$\text{Porosity}=S \times d \times D/w \times 100$$

where S represents an area of the porous membrane; d represents a membrane thickness; w represents a measured mass; and D represents a density of the polyimide. The density of the polyimide is defined as 1.34 g/cm$^3$.

(3) Gurley Value (Gas Permeability):

The Gurley value (seconds required for allowing 100 cc of air to permeate through the porous membrane under a pressure of 0.879 g/m$^2$) was measured in conformity with JIS P8117.

(4) Average Pore Size and Maximum Pore Size:

With respective to 200 or more openings, a pore area was measured from a scanning electron microscopic photograph of the porous membrane surface, and on the assumption that the pore shape is a true circle, the average pore size was determined by calculation from an average value of the pore area according to the following equation:

$$\text{Average pore size}=2 \times (Sa/\pi)^{1/2}$$

where Sa represents an average value of the pore area.

Furthermore, on the assumption that the pore shape is a true circle, the diameter was calculated from the pore area, and its maximum value was defined as a maximum pore size.

(5) Glass Transition Temperature:

A dynamic viscoelasticity was measured using a solid viscoelasticity analyzer under a condition in a tensile mode at a frequency of 10 Hz and a strain of 2% in a nitrogen gas atmosphere, and in its temperature dispersion profile, a temperature at which a loss tangent showed a maximum value was defined as the glass transition temperature.

(6) Dimensional Stability:

The dimensional stability in the membrane plane direction was measured under a condition at 200° C. for 2 hours in conformity with ASTM D1204.

(7) Rate of Change in Membrane Thickness after Loading a Compression Stress:

A membrane to be measured was cut out into a regular square of 3 cm square, nine points were marked in a lattice form by a marker pen, and a membrane thickness was measured by a contact type thickness meter. Subsequently, the membrane subjective to the measurement was compressed using a high precision hot press that is a compression board having a parallel degree of less than ±10 μm and temperature distribution of ±1° C. under a condition at 250° C. for 15 minutes at 0.5 MPa. Subsequently, the membrane was allowed to stand on an SUS plate at room temperature for 30 minutes, and thereafter, the membrane thickness of each of the marked portions was measured by a contact type membrane thickness meter. A rate of change in the membrane thickness before and after the compression in the nine points was determined according to the following equation. An average value in the nine points was defined as the rate of change in the membrane thickness.

Rate of change in membrane thickness (%)=
[1−{(Membrane thickness after compression)/
(Membrane thickness before compression)}]×
100.

(8) Total Light Transmittance (%) and Turbidity (Haze):

The total light transmittance and the turbidity (haze) of the membrane were measured using a haze meter (a trade name: NDH5000, manufactured by Nippon Denshoku Industries Co., Ltd.) in conformity with JIS K7361, 7136 and 7105 and ASTM D1003.

(9) Hue:

The hue of the colored polyimide molded article (film) was measured under a condition of transmission against the plane of a measured material using a spectrophotometer (a trade name: Color Robo III, manufactured by Color Techno System Corporation). The measurement was performed through a neutral density filter.

Furthermore, the hue of the polyimide porous membrane was measured under a condition at a projection angle of 45 degrees against the plane of a measured material using a spectrophotometer (a trade name: Color Robo III, manufactured by Color Techno System Corporation). The film to be measured was allowed to stand on a white material and measured.

The results were shown by digitizing respective indexes in the L*a*b* specification (here, L* represents a brightness; a* represents a chromaticity in the red-green direction; and b* represents a chromaticity in the yellow-blue direction).

Referential Example 1

In heating pellets of a polyacrylonitrile copolymer (a trade name: BAREX 2090S, manufactured by Mitsui Chemicals, Inc., hereinafter referred to as "PAN") in an air atmosphere at from room temperature at a rate of 5° C./min, a change in thermal weight reduction rate was measured. The results are shown in FIG. 1. As a result, a slight weight reduction was observed from the vicinity of 250° C.; and it was noted that the weight reduction was caused in a rate of about 0.2% at 280° C., about 0.5% at 290° C., about 2% at 300° C., and about 8% at 330° C., respectively. It may be considered that such a weight reduction was caused due to the progress of carbonization in a state of simultaneous progress of breakage and crosslinking reaction in the polyacrylonitrile molecule.

From the foregoing results, it is noted that PAN can be preferably used as the coloring precursor in the present invention; and that in the case of using PAN as the coloring precursor in the present invention, it is preferable to apply a thermal treatment at 250° C. or higher, preferably 280° C. or higher, and more preferably 300° C. or higher.

Preparation Example 101

(Preparation of Polyamic Acid Solution Composition A1)

In a 500-mL separable flask, N-methylpyrrolidone (NMP) was used as a solvent, and 3,3',4,4'-biphenyltetracarboxylic dianhydride (s-BPDA) as a tetracarboxylic acid component and 4,4'-diaminodiphenyl ether (DADE) as a diamine component were weighed in a molar ratio of 1 and in a polymer concentration of 6% by mass and thrown. The mixture was subjected to a polymerization reaction at 30° C. for 28 hours, thereby obtaining a polyamic acid solution. This polyamic acid solution had a solid concentration of 6% by mass and a limiting viscosity number of 3.5.

5 parts by mass of PAN (a trade name: BAREX 2090S, manufactured by Mitsui Chemicals, Inc.) was thrown into 100 parts by mass of the obtained polyamic acid. Thereafter, the flask was covered by a separable cover installed with a stirring blade, a nitrogen-introducing tube and an exhaust tube, and stirring was started. After a lapse of 20 hours, 0.5 parts by mass of 3,3',4,4'-biphenyltetracarboxylic acid (BPDA) based on 100 parts by mass of the polyamic acid was added in the flask, and the stirring operation was continued. After a lapse of 40 hours, the stirring was stopped, and a dope within the flask was filtered by a pressure filter (filter paper for use in viscous liquid: No. 60, manufactured by Advantec Mfg., Inc.), thereby obtaining a polyamic acid solution composition A1. The solution was a viscous suspension liquid and had a solution viscosity of 410 poises (at 30° C.).

Preparation Example 102

(Preparation of Polyamic Acid Solution Composition B1)

A polyamic acid solution composition B1 was obtained by the same operation as that in Preparation Example 101, except that PAN was not added. The solution was a viscous liquid and had a solution viscosity of 400 poises (at 30° C.).

Preparation Example 201

(Preparation of Polyamic Acid Solution Composition A2)

In a 500-mL separable flask, N-methylpyrrolidone (NMP) was used as a solvent, and 3,3',4,4'-biphenyltetracarboxylic dianhydride (s-BPDA) as a tetracarboxylic acid component and 4,4'-diaminodiphenyl ether (DADE) as a diamine component were weighed in a molar ratio of 1 and in a polymer concentration of 6% by mass and thrown. The mixture was subjected to a polymerization reaction at 30° C. for 28 hours, thereby obtaining a polyamic acid solution. This polyamic acid solution had a limiting viscosity number of 3.8 and a solid concentration of 6% by mass.

5 parts by mass of PAN (a trade name: BAREX 2090S, manufactured by Mitsui Chemicals, Inc.) was thrown into 100 parts by mass of the obtained polyamic acid. Thereafter, the flask was covered by a separable cover installed with a stirring blade, a nitrogen-introducing tube and an exhaust tube, and stirring was started. After a lapse of 20 hours, 30 parts by mass of benzoic acid and 1 part by mass of 3,3',4,4'-biphenyltetracarboxylic acid based on 100 parts by mass of the polyamic acid were added in the flask, and the stirring operation was continued. After a lapse of 40 hours, the stirring was stopped, and a dope within the flask was filtered by a pressure filter (filter paper for use in viscous liquid: No. 60, manufactured by Advantec Mfg., Inc.), thereby obtaining a polyamic acid solution composition A2. The solution was a viscous suspension liquid and had a solution viscosity of 430 poises (at 30° C.). The results are shown in Table 1.

Preparation Examples 202 to 204

(Preparation of Polyamic Acid Solution Compositions B2, C2 and D2)

Polyamic acid solution compositions B2, C2 and D2 were obtained by the same operation as that in Preparation Example 201, except that the addition amount of PAN was changed as shown in Table 1. The solutions were a viscous suspension liquid.

Preparation Example 205

(Preparation of Polyamic Acid Solution Composition E2)

A polyamic acid solution composition E2 was obtained by the same operation as that in Preparation Example 201, except that 5 parts by mass of ferrocene (manufactured by Wako Pure Chemical Industries, Ltd.), 30 parts by mass of benzoic acid, and 1 part by mass of 3,3',4,4'-biphenyltetracarboxylic acid based on 100 parts by mass of the polyamic acid were added. The solution was a viscous liquid and had a solution viscosity of 460 poises (at 30° C.).

Preparation Example 206

(Preparation of Polyamic Acid Solution Composition F2)

A polyamic acid solution composition F2 was obtained by the same operation as that in Preparation Example 201, except that PAN was not added. The solution was a viscous liquid and had a solution viscosity of 390 poises (at 30° C.).

Preparation Example 207

(Preparation of Polyamic Acid Solution Composition G2)

A polyamic acid solution composition G2 was obtained by the same operation as that in Preparation Example 203, except that benzoic acid was not added. The solution was a viscous liquid and had a solution viscosity of 450 poises (at 30° C.).

Preparation Example 208

(Preparation of Polyamic Acid Solution Composition H2)

A polyamic acid solution composition H2 was obtained by the same operation as that in Preparation Example 207, except that PAN was not added. The solution was a viscous liquid and had a solution viscosity of 425 poises (at 30° C.).

TABLE 1

| | Polyamic acid solution composition | | | | | |
|---|---|---|---|---|---|---|
| | Kind of polyamic acid solution composition | PAN (parts by mass) | Ferrocene (parts by mass) | BPDA*[1] (parts by mass) | Benzoic acid (parts by mass) | Solution viscosity (poises) |
| Preparation Example 101 | Solution composition A1 | 5 | 0 | 0.5 | 0 | 410 |
| Preparation Example 102 | Solution composition B1 | 0 | 0 | 0.5 | 0 | 400 |
| Preparation Example 201 | Solution composition A2 | 5 | 0 | 1 | 30 | 430 |
| Preparation Example 202 | Solution composition B2 | 7 | 0 | 1 | 30 | 440 |
| Preparation Example 203 | Solution composition C2 | 10 | 0 | 1 | 30 | 460 |
| Preparation Example 204 | Solution composition D2 | 20 | 0 | 1 | 30 | 495 |
| Preparation Example 205 | Solution composition E2 | 0 | 5 | 1 | 30 | 460 |
| Preparation Example 206 | Solution composition F2 | 0 | 0 | 1 | 30 | 390 |

TABLE 1-continued

| Kind of polyamic acid solution composition | | PAN (parts by mass) | Ferrocene (parts by mass) | BPDA*1 (parts by mass) | Benzoic acid (parts by mass) | Solution viscosity (poises) |
|---|---|---|---|---|---|---|
| | Polyamic acid solution composition | | | | | |
| Preparation Example 207 | Solution composition G2 | 10 | 0 | 1 | 0 | 450 |
| Preparation Example 208 | Solution composition H2 | 0 | 0 | 1 | 0 | 425 |

*1 3,3',4,4'-Biphenyltetracarboxylic acid

Example 101

(Fabrication of Polyimide Film)

The polyamic acid solution composition A1 obtained in Preparation Example 101 was uniformly cast and coated in a thickness of about 300 μm on a stainless steel-made substrate of 20 cm square, the surface of which had been mirror-polished, at room temperature by using a table-top automatic coater. Thereafter, the whole of the substrate was thrown into an air heating furnace, heated to 360° C. at a temperature rise rate of 10° C./min in average, kept for 5 minutes as it was, and then gradually cooled. The substrate was taken out from the air heating furnace, the surroundings of four sides of the film stuck to the substrate were notched with a cutter knife, and thereafter, the resultant inclusive of the substrate was dipped in pure water for 24 hours. The polyimide film having been naturally separated from the substrate was dried at a temperature of 100° C., thereby obtaining a polyimide film having a membrane thickness of 20 μm. This film assumed a dark brown color. The measurement results of total light transmittance, turbidity and hue, and the like of the polyimide film are shown in Table 2.

Comparative Example 101

(Fabrication of Polyimide Film)

A polyimide film was obtained by the same operation as that in Example 101, except that the polyamic acid solution composition B1 obtained in Preparation Example 102 was used. The obtained film assumed a deeply yellow color and was transparent, and it had a thickness of 21 μm. The measurement results of total light transmittance, turbidity and hue, and the like of the polyimide film are shown in Table 2.

From Table 2, it is noted that in Example 101, coloration was appropriately performed, so the light transmissibility was effectively suppressed.

Example 201

The polyamic acid solution composition A2 obtained in Preparation Example 201 was uniformly cast and coated in a thickness of about 120 μm on a stainless steel-made substrate of 20 cm square, the surface of which had been mirror-polished, at room temperature by using a table-top automatic coater. Thereafter, the resultant was allowed to stand in the air at a temperature of 23° C. and a humidity of 40% for 90 seconds, and thereafter, the whole of the substrate was dipped in a poor solvent against the polyamic acid (water: 80% by mass, NMP: 20% by mass) at room temperature. After dipping, the resultant was allowed to stand for 8 minutes, thereby depositing a polyamic acid membrane on the substrate. Thereafter, the substrate was taken out from the bath, and the polyamic acid membrane deposited on the substrate was separated and then dipped in pure water for 3 minutes, followed by drying in the air at a temperature of 23° C. and a humidity of 40%, thereby obtaining a polyamic acid membrane. Incidentally, a part of this polyamic acid membrane was sampled and measured for the hue. The measurement results of the hue of the polyamic acid membrane are shown in Table 3.

The polyamic acid membrane was stuck onto a pin tenter of 10 cm square and set in an air heating furnace. The resultant was thermally treated in a temperature profile of heating to 360° C. at a temperature rise rate of about 10° C./min and then keeping for 10 minutes as it was, thereby obtaining a polyimide porous membrane.

The obtained polyimide porous membrane had a membrane thickness of 32 μm, a porosity of 79%, and a Gurley value of 22 seconds/100 cc.

TABLE 2

| | Polyamic acid solution composition | Physical properties of polyimide film | | | | | |
|---|---|---|---|---|---|---|---|
| | | Membrane thickness (μm) | Total light transmittance (%) | Turbidity (Haze) | L*a*b* specification | | |
| | | | | | L* | a* | b* |
| Example 101 | Preparation Example 101 | 20 | 4.5 | 68 | 7.6 | 15.4 | 5.9 |
| Comparative Example 101 | Preparation Example 102 | 21 | 78 | 0.8 | 91.5 | −10.9 | 37.2 |

A surface of the polyimide porous membrane was observed by a scanning electron microscope. As a result, the polyimide porous membrane had a porous structure having a lot of communicated pores on the surface of the substrate side and had an average pore size of the surface of 0.19 µm and a maximum pore size of not more than 10 µm. Furthermore, plural macrovoids were present in the section of the polyimide porous membrane, and it could be observed that the polyimide porous membrane had a lot of macrovoids having a length in the membrane lateral direction of 10 µm or more; and that in voids having a length in the lateral direction of 5 µm or more, a number of voids having a ratio (L/d) of a length (L) of the lateral direction to a length (d) of the membrane thickness direction falling within the range of from 0.5 to 3 was 75% or more. That is, it was noted that the obtained porous membrane is a porous membrane of a three-layered structure having two surface layers and a macrovoid layer interposed therebetween and has a structure in which the macrovoid layer has plural macrovoids surrounded by the surface layers and partitions coupled with the surface layers and plural pores, and the pores and the macrovoids are communicated with each other.

The polyimide porous membrane had a glass transition temperature of about 290° C. and a dimensional stability falling within 1% at 200° C. A rate of change in the membrane thickness after loading a compression stress of 0.5 MPa at 250° C. for 15 minutes was not more than 1%. The measurement results of total light transmittance, turbidity and hue, and the like of the polyimide porous membrane are shown in Table 3.

Examples 202 to 205

Polyimide porous membranes were obtained by the same operation as that in Example 201, except that the polyamic acid solution compositions B2 to E2 obtained in Preparation Examples 202 to 205 were used, respectively. The measurement results of membrane thickness, porosity and Gurley value of the obtained polyimide porous membranes are shown in Table 3. All of the membranes assumed a dark brown to black color and were opaque.

A surface of each of the polyimide porous membranes was observed by a scanning electron microscope. As a result, each of the polyimide porous membranes had a porous structure having a lot of communicated pores on the surface of the substrate side and had an average pore size of the surface in the range of from 0.15 to 0.20 µm and a maximum pore size of not more than 10 µm. Furthermore, plural macrovoids were present in the section of the polyimide porous membrane, and a number of voids having the foregoing (L/d) falling within the range of from 0.5 to 3 was 75% or more. That is, it was noted that each of the obtained porous membranes is a porous membrane of a three-layered structure having two surface layers and a macrovoid layer interposed therebetween and has a structure in which the macrovoid layer has plural macrovoids surrounded by the surface layers and partitions coupled with the surface layers and plural pores, and the pores and the macrovoids are communicated with each other. Furthermore, in all of the polyimide porous membranes, the dimensional stability fell within 1% at 200° C., and the foregoing rate of change in the membrane thickness after loading a compression stress was not more than 1%. The measurement results of total light transmittance, turbidity and hue, and the like of the polyimide porous membrane are shown in Table 3.

Example 206

The polyamic acid solution composition G2 obtained in Preparation Example 207 was uniformly cast and coated in a thickness of about 250 µm on a stainless steel-made substrate of 20 cm square, the surface of which had been mirror-polished, at room temperature by using a table-top automatic coater. On the polyamic acid solution coated on the substrate, NMP was uniformly coated as a protective solvent layer using a doctor knife having a gap of 100 µm relative to the liquid surface of the polyamic acid solution, followed by allowing it to stand for one minute. Thereafter, the resultant was allowed to stand in the air at a temperature of 23° C. and a humidity of 40% for 90 seconds, and the whole of the substrate was dipped in a poor solvent against the polyamic acid (methanol: 90% by mass, water: 5% by mass, NMP: 5% by mass) at room temperature. After dipping, the resultant was allowed to stand for 10 minutes, thereby depositing a polyamic acid membrane on the substrate. Thereafter, the substrate was taken out from the bath, and the polyamic acid membrane deposited on the substrate was separated and then dipped in pure water for 3 minutes, followed by drying in the air at a temperature of 23° C. and a humidity of 40%, thereby obtaining a polyamic acid membrane. A part of this polyamic acid membrane was sampled and measured for the hue. The measurement results of the hue of the polyamic acid membrane are shown in Table 3.

The polyamic acid membrane was stuck onto a pin tenter of 10 cm square and set in an air heating furnace. The resultant was thermally treated in a temperature profile of heating to 360° C. at a temperature rise rate of about 10° C./min and then keeping for 10 minutes as it was, thereby obtaining a polyimide porous membrane.

The obtained polyimide porous membrane assumed a dark brown to black color and was opaque, and it had a membrane thickness of 29 µm, a porosity of 48%, and a Gurley value of 78 seconds/100 cc.

A surface of the polyimide porous membrane was observed by a scanning electron microscope. As a result, the polyimide porous membrane had a porous structure in which the polyimide was in a line in a network state on the both surfaces thereof, and it had an average pore size of the surface of 0.17 µm and a maximum pore size of 1.6 µm. Furthermore, the section of the polyimide porous membrane had a porous structure in which the polyimide and a space were co-continuously uniformly in a line, and a void having a length in the membrane lateral direction of 1 µm or more was not observed. That is, it was confirmed that the obtained membrane is a uniform membrane free from a minute layer on the both surfaces thereof and has a porous structure having pores having an average pore size of from 0.01 to 5 µm on one surface or both surfaces thereof, in which the pores are non-linearly continued from one surface toward the other surface.

The polyimide porous membrane had a glass transition temperature of about 280° C. and a dimensional stability falling within 1% at 200° C. A rate of change in the membrane thickness after loading a compression stress of 0.5 MPa at 250° C. for 15 minutes was not more than 1%. The measurement results of total light transmittance, turbidity and hue, and the like of the polyimide porous membrane are shown in Table 3.

Example 207

The polyamic acid solution composition B2 obtained in Preparation Example 202 was uniformly cast and coated in a thickness of about 120 µm on a stainless steel-made substrate of 20 cm square, the surface of which had been mirror-polished, at room temperature by using a table-top automatic coater. Thereafter, the resultant was allowed to stand in the air at a temperature of 23° C. and a humidity of 40% for 90 seconds, and thereafter, the whole of the substrate was dipped in a poor solvent against the polyamic acid (water: 80% by mass, NMP: 20% by mass) at room temperature. After dipping, the resultant was allowed to stand for 8 minutes, thereby depositing a polyamic acid membrane on the substrate. Thereafter, the substrate was taken out from the bath, and the polyamic acid membrane deposited on the substrate was separated and then dipped in pure water for 3 minutes, followed by drying in the air at a temperature of 23° C. and a humidity of 40%, thereby obtaining a polyamic acid membrane. Incidentally, a part of this polyamic acid membrane was sampled and measured for the hue. The measurement results of the hue of the polyamic acid membrane are shown in Table 3.

The polyamic acid membrane was stuck onto a pin tenter of 10 cm square and set in an air heating furnace. The resultant was thermally treated in a temperature profile of heating to 280° C. at a temperature rise rate of about 10° C./min and then keeping for 10 minutes as it was, thereby obtaining a polyimide porous membrane.

The obtained polyimide porous membrane had a membrane thickness of 33 μm, a porosity of 80%, and a Gurley value of 56 seconds/100 cc.

A surface of the polyimide porous membrane was observed by a scanning electron microscope. As a result, the polyimide porous membrane had a porous structure having a lot of communicated pores on the surface of the substrate side and had an average pore size of the surface of 0.16 μm and a maximum pore size of not more than 10 μm. Furthermore, plural macrovoids were present in the section of the polyimide porous membrane, and it could be observed that the polyimide porous membrane had a lot of macrovoids having a length in the membrane lateral direction of 10 μm or more; and that in voids having a length in the lateral direction of 5 μm or more, a number of voids having a ratio (L/d) of a length (L) of the lateral direction to a length (d) of the membrane thickness direction falling within the range of from 0.5 to 3 was 75% or more. That is, it was noted that the obtained porous membrane is a porous membrane of a three-layered structure having two surface layers and a macrovoid layer interposed therebetween and has a structure in which the macrovoid layer has plural macrovoids surrounded by the surface layers and partitions coupled with the surface layers and plural pores, and the pores and the macrovoids are communicated with each other.

The polyimide porous membrane had a glass transition temperature of about 275° C. and a dimensional stability falling within 1% at 200° C. A rate of change in the membrane thickness after loading a compression stress of 0.5 MPa at 250° C. for 15 minutes was not more than 1%. The measurement results of total light transmittance, turbidity and hue, and the like of the polyimide porous membrane are shown in Table 3.

Example 208

A polyimide porous membrane was obtained by the same operation as that in Example 207, except that the maximum temperature of the thermal treatment was changed to 300° C. The obtained polyimide porous membrane had a membrane thickness of 33 μm, a porosity of 79%, and a Gurley value of 41 seconds/100 cc.

A surface of the polyimide porous membrane was observed by a scanning electron microscope. As a result, the polyimide porous membrane had a porous structure having a lot of communicated pores on the surface of the substrate side and had an average pore size of the surface of 0.17 μm and a maximum pore size of not more than 10 μm. Furthermore, plural macrovoids were present in the section of the polyimide porous membrane, and it could be observed that the polyimide porous membrane had a lot of macrovoids having a length in the membrane lateral direction of 10 μm or more; and that in voids having a length in the lateral direction of 5 μm or more, a number of voids having a ratio (L/d) of a length (L) of the lateral direction to a length (d) of the membrane thickness direction falling within the range of from 0.5 to 3 was 75% or more. That is, it was noted that the obtained porous membrane is a porous membrane of a three-layered structure having two surface layers and a macrovoid layer interposed therebetween and has a structure in which the macrovoid layer has plural macrovoids surrounded by the surface layers and partitions coupled with the surface layers and plural pores, and the pores and the macrovoids are communicated with each other.

The polyimide porous membrane had a glass transition temperature of about 280° C. and a dimensional stability falling within 1% at 200° C. A rate of change in the membrane thickness after loading a compression stress of 0.5 MPa at 250° C. for 15 minutes was not more than 1%. The measurement results of total light transmittance, turbidity and hue, and the like of the polyimide porous membrane are shown in Table 3.

Example 209

A polyimide porous membrane was obtained by the same operation as that in Example 207, except that the maximum temperature of the thermal treatment was changed to 400° C. The obtained polyimide porous membrane had a membrane thickness of 31 μm, a porosity of 76%, and a Gurley value of 31 seconds/100 cc.

A surface of the polyimide porous membrane was observed by a scanning electron microscope. As a result, the polyimide porous membrane had a porous structure having a lot of communicated pores on the surface of the substrate side and had an average pore size of the surface of 0.18 μm and a maximum pore size of not more than 10 μm. Furthermore, plural macrovoids were present in the section of the polyimide porous membrane, and it could be observed that the polyimide porous membrane had a lot of macrovoids having a length in the membrane lateral direction of 10 μm or more; and that in voids having a length in the lateral direction of 5 μm or more, a number of voids having a ratio (L/d) of a length (L) of the lateral direction to a length (d) of the membrane thickness direction falling within the range of from 0.5 to 3 was 75% or more. That is, it was noted that the obtained porous membrane is a porous membrane of a three-layered structure having two surface layers and a macrovoid layer interposed therebetween and has a structure in which the macrovoid layer has plural macrovoids surrounded by the surface layers and partitions coupled with the surface layers and plural pores, and the pores and the macrovoids are communicated with each other.

The polyimide porous membrane had a glass transition temperature of about 290° C. and a dimensional stability falling within 1% at 200° C. A rate of change in the membrane thickness after loading a compression stress of 0.5 MPa at 250° C. for 15 minutes was not more than 1%. The measurement results of total light transmittance, turbidity and hue, and the like of the polyimide porous membrane are shown in Table 3.

Example 210

A polyimide porous membrane was obtained by the same operation as that in Example 207, except that the solution to be used was changed to the polyamic acid solution composition C2 obtained in Preparation Example 203. The obtained polyimide porous membrane had a membrane thickness of 34 μm, a porosity of 81%, and a Gurley value of 53 seconds/100 cc.

A surface of the polyimide porous membrane was observed by a scanning electron microscope. As a result, the polyimide porous membrane had a porous structure having a lot of communicated pores on the surface of the substrate side and had an average pore size of the surface of 0.16 μm and a maximum pore size of not more than 10 μm. Furthermore, plural macrovoids were present in the section of the polyimide porous membrane, and it could be observed that the polyimide porous membrane had a lot of macrovoids having a length in the membrane lateral direction of 10 μm or more; and that in voids having a length in the lateral direction of 5 μm or more, a number of voids having a ratio (L/d) of a length (L) of the lateral direction to a length (d) of the membrane thickness direction falling within the range of from 0.5 to 3 was 75% or more. That is, it was noted that the obtained porous membrane is a porous membrane of a three-layered structure having two surface layers and a macrovoid layer interposed therebetween and has a structure in which the macrovoid layer has plural macrovoids surrounded by the surface layers and partitions coupled with the surface layers and plural pores, and the pores and the macrovoids are communicated with each other.

The polyimide porous membrane had a glass transition temperature of about 275° C. and a dimensional stability falling within 1% at 200° C. A rate of change in the membrane thickness after loading a compression stress of 0.5 MPa at 250° C. for 15 minutes was not more than 1%. The measurement results of total light transmittance, turbidity and hue, and the like of the polyimide porous membrane are shown in Table 3.

Example 211

A polyimide porous membrane was obtained by the same operation as that in Example 208, except that the solution to be used was changed to the polyamic acid solution composition C2 obtained in Preparation Example 203. The obtained polyimide porous membrane had a membrane thickness of 32 μm, a porosity of 80%, and a Gurley value of 38 seconds/100 cc.

A surface of the polyimide porous membrane was observed by a scanning electron microscope. As a result, the polyimide porous membrane had a porous structure having a lot of communicated pores on the surface of the substrate side and had an average pore size of the surface of 0.17 μm and a maximum pore size of not more than 10 μm. Furthermore, plural macrovoids were present in the section of the polyimide porous membrane, and it could be observed that the polyimide porous membrane had a lot of macrovoids having a length in the membrane lateral direction of 10 μm or more; and that in voids having a length in the lateral direction of 5 μm or more, a number of voids having a ratio (L/d) of a length (L) of the lateral direction to a length (d) of the membrane thickness direction falling within the range of from 0.5 to 3 was 75% or more. That is, it was noted that the obtained porous membrane is a porous membrane of a three-layered structure having two surface layers and a macrovoid layer interposed therebetween and has a structure in which the macrovoid layer has plural macrovoids surrounded by the surface layers and partitions coupled with the surface layers and plural pores, and the pores and the macrovoids are communicated with each other.

The polyimide porous membrane had a glass transition temperature of about 285° C. and a dimensional stability falling within 1% at 200° C. A rate of change in the membrane thickness after loading a compression stress of 0.5 MPa at 250° C. for 15 minutes was not more than 1%. The measurement results of total light transmittance, turbidity and hue, and the like of the polyimide porous membrane are shown in Table 3.

Example 212

A polyimide porous membrane was obtained by the same operation as that in Example 209, except that the solution to be used was changed to the polyamic acid solution composition C2 obtained in Preparation Example 203. The obtained polyimide porous membrane had a membrane thickness of 31 μm, a porosity of 78%, and a Gurley value of 28 seconds/100 cc.

A surface of the polyimide porous membrane was observed by a scanning electron microscope. As a result, the polyimide porous membrane had a porous structure having a lot of communicated pores on the surface of the substrate side and had an average pore size of the surface of 0.18 μm and a maximum pore size of not more than 10 μm. Furthermore, plural macrovoids were present in the section of the polyimide porous membrane, and it could be observed that the polyimide porous membrane had a lot of macrovoids having a length in the membrane lateral direction of 10 μm or more; and that in voids having a length in the lateral direction of 5 μm or more, a number of voids having a ratio (L/d) of a length (L) of the lateral direction to a length (d) of the membrane thickness direction falling within the range of from 0.5 to 3 was 75% or more. That is, it was noted that the obtained porous membrane is a porous membrane of a three-layered structure having two surface layers and a macrovoid layer interposed therebetween and has a structure in which the macrovoid layer has plural macrovoids surrounded by the surface layers and partitions coupled with the surface layers and plural pores, and the pores and the macrovoids are communicated with each other.

The polyimide porous membrane had a glass transition temperature of about 290° C. and a dimensional stability falling within 1% at 200° C. A rate of change in the membrane thickness after loading a compression stress of 0.5 MPa at 250° C. for 15 minutes was not more than 1%. The measurement results of total light transmittance, turbidity and hue, and the like of the polyimide porous membrane are shown in Table 3.

Comparative Example 201

A polyimide porous membrane was obtained by the same operation as that in Example 201, except that the polyamic acid solution composition F2 obtained in Preparation Example 206 was used. The obtained membrane assumed a pale yellow color and was opaque. The membrane thickness, porosity and Gurley value of the obtained polyimide porous membrane are shown in Table 3.

A surface of the polyimide porous membrane was observed by a scanning electron microscope. As a result, the polyimide porous membrane had a porous structure having a lot of communicated pores on the surface of the substrate side and had an average pore size of the surface of 0.18 μm and a maximum pore size of not more than 10 μm. Furthermore, plural macrovoids were present in the section of the polyimide porous membrane, and in voids having a length in the lateral direction of 5 μm or more, a number of voids having a ratio L/d of a length (L) of the lateral direction to a length (d) of the membrane thickness direction falling within the range of from 0.5 to 3 was 75% or more. That is, it was noted that the obtained porous membrane is a porous membrane of a three-layered structure having two surface layers and a macrovoid layer interposed therebetween and has a structure in which the macrovoid layer has plural macrovoids surrounded by the surface layers and partitions coupled with the surface layers and plural pores, and the pores and the macrovoids are communicated with each other. Furthermore, in the polyimide porous membrane, the dimensional stability fell within 1% at 200° C., and the foregoing rate of change in the membrane thickness after loading a compression stress was not more than 1%. The measurement results of total light transmittance, turbidity and hue, and the like of the polyimide porous membrane are shown in Table 3.

Comparative Example 202

A polyimide porous membrane was obtained by the same operation as that in Example 206, except that the polyamic acid solution composition H obtained in Preparation Example 208 was used. The obtained membrane assumed a pale yellow color and was opaque, and it had a membrane thickness of 30 μm, a porosity of 48%, and a Gurley value of 69 seconds/100 cc.

A surface of the polyimide porous membrane was observed by a scanning electron microscope. As a result, the polyimide porous membrane had a porous structure in which the polyimide was in a line in a network state on the both surfaces thereof, and it had an average pore size of the surface of 0.17 μm and a maximum pore size of 1.7 μm. Furthermore, the section of the polyimide porous membrane had a porous structure in which the polyimide and a space were co-continuously uniformly in a line, and a void having a length in the membrane lateral direction of 1 μm or more was not observed. That is, it was confirmed that the obtained membrane is a uniform membrane free from a minute layer on the both surfaces thereof and has a porous structure having pores having an average pore size of from 0.01 to 5 μm on one surface or both surfaces thereof, in which the pores are non-linearly continued from one surface toward the other surface.

The polyimide porous membrane had a glass transition temperature of about 285° C. and a dimensional stability falling within 1% at 200° C. A rate of change in the membrane thickness after loading a compression stress of 0.5 MPa at 250° C. for 15 minutes was not more than 1%. The measurement results of total light transmittance, turbidity and hue, and the like of the polyimide porous membrane are shown in Table 3.

From Table 3, it is noted that in Examples 201 to 212, though the polyamic acids prior to applying a thermal imidization treatment were not colored, coloration was appropriately performed by the thermal imidization treatment, so the light transmission was effectively suppressed. Furthermore, in addition to the above, also taking Comparative Examples 201 and 202 into consideration, it is noted that coloration was achieved without impairing the structure and functions of the porous membrane.

INDUSTRIAL APPLICABILITY

The colored polyimide molded article of the present invention can be suitably used as, for example, a raw material for electronic components or electronic appliances such as a printed wiring board, a flexible printed board, a TAB tape, a COF tape, a cover film, a reinforcing film, a belt, e.g., a drive belt, etc., a tube, and the like, or a coating material of a molded article such as a metallic molded article of a copper wire, etc., or the like. Furthermore, the colored polyimide porous membrane of the present invention can be suitably utilized in various fields requiring heat resistance, light screening properties, antistatic properties, thermal conductivity, and the like, for example, interlayer insulating membranes for multilayered substrate, liquid crystal orientation membranes, color filter protective membranes, optical waveguides, optical compensatory membranes, and the like.

The invention claimed is:
1. A process for producing a colored polyimide molded article, the process comprising:
(a) molding a polyimide composition consisting essentially of a polyimide solution and a coloring precursor to form a molded product; and
(b) thermally treating the molded product at a temperature of from 350 to 500° C. in the air for a period of from 5 to 60 minutes to color the coloring precursor and thereby obtain the colored polyimide molded article, wherein
the coloring precursor is a polymer obtained from an acrylonitrile-comprising monomer, and
no carbon black is present in the polyimide composition.

TABLE 3

| | | Hue of polyamic acid membrane | | | Physical properties of polyimide porous membrane | | | | | | | |
|---|---|---|---|---|---|---|---|---|---|---|---|---|
| | | L*a*b* specification | | | Membrane thickness | Porosity | Gurley value | Total light transmittance | Turbidity | L*a*b* specification | | |
| | Polyamic acid solution composition | L* | a* | b* | (μm) | (%) | (sec/100 cc) | (%) | (haze) | L* | a* | b* |
| Example 201 | Preparation Example 201 | 97.8 | −2.0 | 4.2 | 32 | 79 | 22 | 9 | 97 | 45.1 | 2.2 | 15.6 |
| Example 202 | Preparation Example 202 | 96.0 | −1.7 | 3.9 | 31 | 78 | 29 | 9 | 76 | 42.3 | 5.2 | 4.5 |
| Example 203 | Preparation Example 203 | 96.0 | −2.1 | 4.4 | 32 | 78 | 23 | 8 | 95 | 40.0 | 7.0 | 7.7 |
| Example 204 | Preparation Example 204 | 93.5 | −2.3 | 5.3 | 30 | 76 | 31 | 3 | 96 | 35.0 | 5.5 | −1.2 |
| Example 205 | Preparation Example 205 | 95.3 | −2.0 | 4.2 | 30 | 77 | 11 | 11 | 97 | 58.3 | 4.1 | 12.5 |
| Example 206 | Preparation Example 207 | 95.1 | −2.1 | 3.7 | 29 | 48 | 78 | 2 | 95 | 39.9 | 6.8 | 7.1 |
| Example 207 | Preparation Example 202 | 96.0 | −1.7 | 3.9 | 33 | 80 | 56 | 14 | 98 | 60.8 | 6.8 | 18.0 |
| Example 208 | Preparation Example 202 | 96.0 | −1.7 | 3.9 | 33 | 79 | 41 | 9 | 97 | 46.3 | 7.3 | 1.5 |
| Example 209 | Preparation Example 202 | 96.0 | −1.7 | 3.9 | 31 | 76 | 31 | 8 | 96 | 33.2 | 10.0 | −6.8 |
| Example 210 | Preparation Example 203 | 96.0 | −2.1 | 4.4 | 34 | 81 | 53 | 11 | 98 | 66.0 | 7.4 | 16.7 |
| Example 211 | Preparation Example 203 | 96.0 | −2.1 | 4.4 | 32 | 80 | 38 | 6 | 96 | 41.6 | 5.3 | 9.0 |
| Example 212 | Preparation Example 203 | 96.0 | −2.1 | 4.4 | 31 | 78 | 28 | 4 | 94 | 31.5 | 7.9 | −5.3 |
| Comparative Example 201 | Preparation Example 206 | 97.3 | −2.1 | 4.9 | 32 | 78 | 39 | 21 | 87 | 90.4 | −6.4 | 25.5 |
| Comparative Example 202 | Preparation Example 208 | 94.2 | −2.0 | 3.5 | 30 | 48 | 69 | 4 | 90 | 90.2 | −7.2 | 24.3 |

2. The process of claim 1, wherein the polyimide composition is a suspension liquid or a transparent uniform solution.

3. The process of claim 1, wherein the coloring precursor is polyacrylonitrile.

* * * * *

UNITED STATES PATENT AND TRADEMARK OFFICE
CERTIFICATE OF CORRECTION

PATENT NO. : 9,902,824 B2
APPLICATION NO. : 15/094223
DATED : February 27, 2018
INVENTOR(S) : Shyusei Ohya et al.

It is certified that error appears in the above-identified patent and that said Letters Patent is hereby corrected as shown below:

On the Title Page

Item (71) should read:
-- (71) Applicant: UBE INDUSTRIES, LTD., Ube-shi (JP) --

Signed and Sealed this
Tenth Day of December, 2019

Andrei Iancu
*Director of the United States Patent and Trademark Office*